(12) United States Patent
Bowring et al.

(10) Patent No.: US 9,335,407 B2
(45) Date of Patent: May 10, 2016

(54) DETECTION OF OBJECTS

(75) Inventors: Nicholas Bowring, Hope (GB); David Andrews, Stockport (GB); Nacer Ddine Rezgui, Manchester (GB); Stuart Harmer, Manchester (GB)

(73) Assignee: RADIO PHYSICS SOLUTIONS LTD, Birmingham (GB)

( * ) Notice: Subject to any disclaimer, the term of this patent is extended or adjusted under 35 U.S.C. 154(b) by 889 days.

(21) Appl. No.: 13/496,646

(22) PCT Filed: Sep. 17, 2010

(86) PCT No.: PCT/GB2010/001744
§ 371 (c)(1),
(2), (4) Date: Jun. 22, 2012

(87) PCT Pub. No.: WO2011/033264
PCT Pub. Date: Mar. 24, 2011

(65) Prior Publication Data
US 2012/0256786 A1    Oct. 11, 2012

(30) Foreign Application Priority Data
Sep. 17, 2009 (GB) .................................. 0916300.7

(51) Int. Cl.
| G01S 13/00 | (2006.01) |
|---|---|
| G01S 13/88 | (2006.01) |
| G01S 7/02 | (2006.01) |
| G01S 7/41 | (2006.01) |
| G01S 13/04 | (2006.01) |
| G01S 13/89 | (2006.01) |

(52) U.S. Cl.
CPC ............... *G01S 13/887* (2013.01); *G01S 7/024* (2013.01); *G01S 7/412* (2013.01); *G01S 13/04* (2013.01); *G01S 13/885* (2013.01); *G01S 13/89* (2013.01)

(58) Field of Classification Search
CPC ..... G01S 13/89; G01S 13/885; G01S 13/887; G01S 7/024; G01S 7/412; G01S 13/04
USPC ......................................................... 342/22
See application file for complete search history.

(56) References Cited

U.S. PATENT DOCUMENTS

| 5,073,782 A | 12/1991 | Huguenin et al. |
|---|---|---|
| 5,264,856 A | 11/1993 | Thurlow |

(Continued)

FOREIGN PATENT DOCUMENTS

| CN | 1926783 | 3/2007 |
|---|---|---|
| GB | 869770 | 6/1961 |

(Continued)

OTHER PUBLICATIONS

PCT International Preliminary Report on Patentability, PCT/GB2010/001744, Mar. 20, 2012.*

(Continued)

*Primary Examiner* — Frank J McGue
(74) *Attorney, Agent, or Firm* — Conley Rose, P.C.

(57) ABSTRACT

A detection method comprising directing radiation such that it is incident upon a target, the radiation containing a component having a first polarisation and a component having a second orthogonal polarisation, detecting radiation which is scattered from the target, and analysing the polarisation state of the detected scattered radiation to determine whether the target includes an object.

22 Claims, 8 Drawing Sheets

(56) References Cited

U.S. PATENT DOCUMENTS

| | | |
|---|---|---|
| 5,337,058 A | 8/1994 | Cross |
| 5,486,833 A | 1/1996 | Barrett |
| 5,704,355 A | 1/1998 | Bridges |
| 5,807,257 A | 9/1998 | Bridges |
| 6,061,589 A | 5/2000 | Bridges et al. |
| 6,243,036 B1 | 6/2001 | Chadwick et al. |
| 6,359,582 B1 | 3/2002 | MacAleese et al. |
| 6,421,550 B1 | 7/2002 | Bridges et al. |
| 6,777,684 B1 | 8/2004 | Volkov et al. |
| 6,856,271 B1 | 2/2005 | Hausner |
| 6,967,612 B1 | 11/2005 | Gorman et al. |
| 7,167,123 B2 | 1/2007 | Hausner et al. |
| 7,246,522 B1 | 7/2007 | Diaz et al. |
| 7,304,603 B2 | 12/2007 | Reed et al. |
| 7,450,052 B2 | 11/2008 | Hausner et al. |
| 7,492,303 B1 * | 2/2009 | Levitan et al. .......... 342/22 |
| 7,800,527 B2 | 9/2010 | Douglass et al. |
| 2002/0044282 A1 * | 4/2002 | Moeller et al. ........ 356/369 |
| 2002/0130804 A1 | 9/2002 | McMakin et al. |
| 2005/0230604 A1 | 10/2005 | Rowe et al. |
| 2006/0066469 A1 | 3/2006 | Foote et al. |
| 2007/0052576 A1 | 3/2007 | Hausner et al. |
| 2007/0102629 A1 | 5/2007 | Richard et al. |
| 2007/0132630 A1 | 6/2007 | Beckner |
| 2008/0174476 A1 | 7/2008 | Detlefsen et al. |
| 2009/0195435 A1 | 8/2009 | Kapilevich et al. |
| 2010/0265117 A1 | 10/2010 | Weiss |

FOREIGN PATENT DOCUMENTS

| | | |
|---|---|---|
| GB | 2299214 | 9/1996 |
| GB | 2435509 | 8/2007 |
| JP | 2008-275382 | 11/2008 |
| RU | 2187129 | 8/2002 |
| WO | 90/07130 | 6/1990 |
| WO | 00/75892 | 12/2000 |
| WO | 02/17231 | 2/2002 |
| WO | 2005025074 | 3/2005 |
| WO | 2006/001821 | 1/2006 |
| WO | 2006/021788 | 3/2006 |
| WO | 2006/021799 | 3/2006 |
| WO | 2006/137883 | 12/2006 |
| WO | 2007/011391 | 1/2007 |
| WO | 2007/086916 | 8/2007 |
| WO | 2007/130238 | 11/2007 |
| WO | 2007/130288 | 11/2007 |
| WO | 2007/148327 | 12/2007 |
| WO | WO2009/053960 A2 * | 4/2009 |
| WO | 2009/062946 | 5/2009 |
| WO | 2009/115818 | 9/2009 |

OTHER PUBLICATIONS

"Preliminary Investigation of Breast tumour Detection Using Cross-Vivaldi Antenna" Zhang et al, Proceedings of the 2005 IEEE, Engineering in Medicine and Biology 27th Annual Conference, Shanghai, China, pp. 6691-6694.

Search Report issued Jan. 5, 2011 in UK Patent Application Serial No. GB1015651.1.

English Language Abstract for Japanese Publication JP-2008-275382, published Nov. 13, 2008.

English Language Abstract for Russian Publication RU-2187129-C1, published Aug. 10, 2002.

International Search Report issued Feb. 4, 2011 in International Patent Application Serial No. PCT/GB10/001744.

GB Application No. GB0904640.0, search report dated Jan. 5, 2010.

GB Application No. GB1020664.7 search/exam report dated Feb. 24, 2011.

GB Application No. GB0904640.0 search/exam report dated Jul. 6, 2009.

GB Application No. GB0804944.7 search/exam report dated Jun. 27, 2008.

PCT Application U.S. Appl. No. PCT/GB2009/000752 ISR dated Nov. 24, 2009.

* cited by examiner

DETECTION OF OBJECTS

TECHNICAL FIELD

The present invention relates to the detection of objects.

BACKGROUND ART

It is well known to use electromagnetic radiation to detect the presence of objects (e.g. handheld detectors used for detecting objects on or under the ground, and walk-through arches at airports). However, the conventional detectors used at airports may be unable to determine the dimensions of objects to any significant degree, and thus may be unable to distinguish between objects of different types, i.e. harmless (belt buckles, cameras), and potentially dangerous (guns, knives).

The use of microwaves (electromagnetic waves with wavelengths in the centimetre to millimetre range) may provide a means for the standoff detection and identification of concealed conducting items such as handguns and knives. Large metal objects, such as handguns, may give a significantly different and generally larger response when irradiated by low power microwaves than the human body, clothing and/or benign normally-carried objects. The larger response may be detected using a combination of antenna and receiver. When an object is illuminated with swept and/or stepped frequency microwave radiation, the frequency response of radiation returned from the object may provide information regarding dimensions of the object.

It is desirable to provide a system which is capable of detecting objects, for example knives, in a manner which is not disclosed in the prior art.

SUMMARY OF THE INVENTION

According to a first aspect of the invention there is provided a detection method comprising directing radiation such that it is incident upon a target, the radiation containing a component having a first polarisation and a component having a second orthogonal polarisation, detecting radiation which is scattered from the target, and analysing the polarisation state of the detected scattered radiation to determine whether the target includes an object.

Using radiation containing a component having a first polarisation and a second orthogonal polarisation is advantageous because it avoids the possibility that the radiation is orthogonal or parallel to an anisotropic object such as a knife. If the radiation were to be orthogonal or parallel to an anisotropic object (as could happen in a prior art detection method) then this might cause a zero or very small signal to be detected such that the presence of the knife or other anisotropic object is not detected.

The term 'polarisation state' may be interpreted as encompassing a comparison of the relative size of polarisation components of the detected scattered radiation in a given reference frame (e.g. a pair of orthogonal axes).

The detection method may use the amplitude of the detected scattered radiation in addition to the polarisation state. The amplitude may for example provide an indication of the size of a scattering surface of an object. In this context the term amplitude may include measurements such as the intensity of the detected scattered radiation.

The analysis may comprise comparing the polarisation state of the detected scattered radiation with polarisation sates of scattered radiation which would be expected if an object was present.

The radiation may be swept frequency radiation. Using swept frequency radiation may provide information about the depth of the object (i.e. the size of object in a direction substantially parallel to the direction of propagation of the radiation). This may assist in determining whether the object is a threat object or a non-threat object, and may assist the identification of the object.

The analysis may comprise comparing a pattern in the frequency response of the detected scattered radiation with previously recorded patterns, or performing an equivalent comparison in the time domain.

The analysis may determine whether the object is a threat object or a non-threat object.

The analysis may provide an identification of the object. This may be performed using a classification method based upon comparing a pattern in the frequency response of the detected scattered radiation with previously recorded patterns and looking for a match or a correlation (or other correspondence).

The detected scattered radiation may be cross-polarised scattered radiation.

The radiation may be provided with a rotating linear polarisation.

The radiation may be detected using a receiver which provides rotating detection of linear polarisation.

The radiation may be detected using a first receiver configured to receive radiation having a first linear polarisation and a second receiver configured to receive radiation having a second linear polarisation.

The radiation may be generated using a first transmitter configured to transmit radiation having a first linear polarisation and is subsequently generated using a second transmitter configured to transmit radiation having a second linear polarisation.

The radiation may be detected using a first receiver configured to receive radiation having a third linear polarisation and a second receiver configured to receive radiation having a fourth linear polarisation.

The third linear polarisation may be substantially orthogonal to the first linear polarisation and the fourth linear polarisation is substantially orthogonal to the second linear polarisation.

The second linear polarisation may subtend an angle of around 45° relative to the first linear polarisation.

The radiation may be generated using a transmitter with transmits circularly or elliptically polarised radiation.

The detected scattered radiation may be received by a receiver which is configured to receive radiation having the same handedness of polarisation as the transmitted radiation.

The method may further comprise, when an object is present, analysing the polarisation of the detected scattered radiation as a function of frequency to determine whether the object is a threat object or a non-threat object.

The method may further comprise analysing the polarisation of the detected scattered radiation as a function of frequency to identify the object.

The swept frequency radiation may comprise radiation which is stepped through a plurality of discrete frequencies.

Optionally, the analysis of the detected scattered radiation does not include phase information.

Optionally, the analysis of the detected scatter radiation includes phase information.

The analysis may be performed using an artificial neural network or equivalent software which has been previously trained to identify objects.

According to a second aspect of the invention there is provided a detection system comprising a transmitter configured to direct radiation such that it is incident upon a target, the radiation containing a component having a first polarisation and a component having a second orthogonal polarisation, a receiver and detector configured to receive and detect radiation which is scattered from the target, and a processor which is configured to analyse the polarisation state of the detected scattered radiation to determine whether the target includes an object.

The detection system may be sufficiently portable that it may be used in a hand held manner.

The detection system may be further configured to implement one or more elements of the detection method referred to above.

Some embodiments of the present invention may include a recorded or recordable medium having recorded or stored thereon digital data defining or transformable into instructions for execution by processing circuitry, the instructions corresponding the methods described herein.

Some embodiments of the present invention may include a server comprising processing circuitry, memory and a communications device, the server being programmed for communicating on demand or otherwise digital data defining or transformable into instructions for execution by processing circuitry, the instructions corresponding to the methods described herein.

The invention may provide detection of threat objects at stand-off distances.

BRIEF DESCRIPTION OF THE FIGURES

Embodiments of the invention will now be described in detail, by way of example, with reference to the accompanying drawings, in which.

DETAILED DESCRIPTION OF EMBODIMENTS

Figure 1:
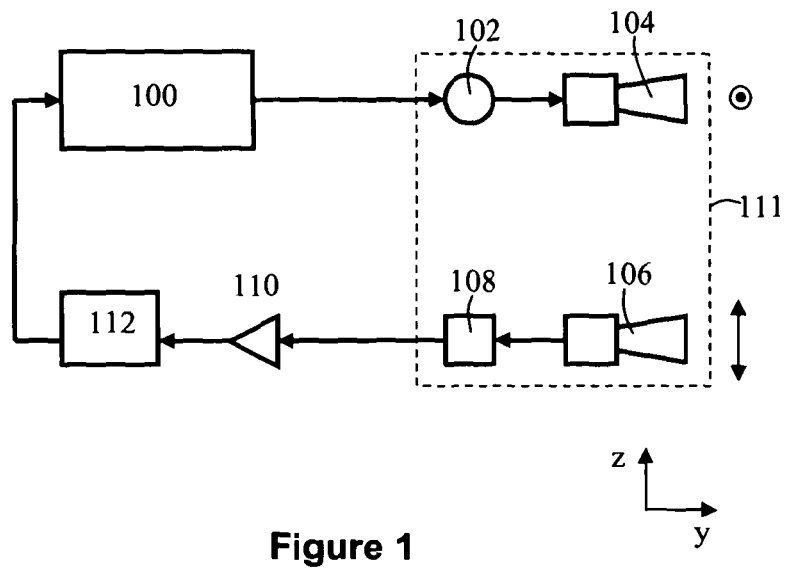
FIG. 1 is a schematic diagram which shows an object detection system according to an embodiment of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the Figures. It will be understood that these terms are intended to encompass different orientations of the device in addition to the orientation depicted in the Figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention includes methods which may be implemented in an automated manner, and may comprise computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts of the methods.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the methods. It is to be understood that individual functions/acts of a method may, where the context allows, be performed in an order which differs from the described order.

Embodiments of the invention may be used for remotely detecting the presence and/or size of metal and/or dielectric objects concealed underneath clothing. Embodiments herein may be used for remotely detecting metal and/or dielectric objects. A dielectric in this context is a non-conducting (i.e. insulating) substance such as ceramic that has a low enough permittivity to allow microwaves to pass through. A ceramic knife or gun are examples of dielectric objects. Embodiments of the invention may detect objects which are anisotropic and/or which include anisotropic edges. Embodiments of the invention may be particularly suited to detecting metal objects which are anisotropic and/or which include anisotropic edges.

Embodiments of the invention may direct swept frequency radiation (which may comprise stepped frequency radiation) at a target and detect radiation which is scattered from the target. Embodiments of the invention may detect the amplitude and phase of the scattered radiation or may detect the amplitude of the scattered radiation without detecting the phase. Detection of the amplitude and phase may be referred to as quadrature detection, and detection of the amplitude only may be referred to as direct detection. In this context the term 'amplitude' may be considered to encompass the square of the amplitude (irradiance) or other related measurements. From a mathematical point of view, the use of swept frequency radiation may be considered to be similar to using a fast microwave pulse and measuring the response as function of time (as used in conventional radar).

FIG. 1 is a schematic diagram of an object detection system according to an embodiment of the invention which uses direct detection. The object detection system includes a microwave source 100 which is connected via a frequency multiplier 102 to a gain horn that acts as a transmitter 104. The transmitter 104 is configured to transmit microwave radiation over a range of frequencies. Focussing optics (not shown) may be used in combination with the gain horn to focus the radiation such that the radiation is incident upon a person being monitored with a desired cross-sectional beam area, which may be commensurate with the size of the object being detected. A second gain horn acts as a receiver 106 which is configured to receive radiation scattered from the person being monitored. The transmitter 104 and the receiver 106 (and associated focussing optics) may be located adjacent to one another or may be spaced apart from one another. The receiver passes received scattered radiation to a detector 108 which detects the radiation and provides an electrical output signal. An amplifier 110, which is connected to the detector 108, is configured to amplify output from the detector and pass the amplified output to a computer 112 (or other data capturing and processing apparatus). The amplitude of detected scattered radiation may be stored by the computer 112 as a function of the radiation frequency. Properties of the detected scattered radiation are analysed by the computer 112, which thereby identifies the presence of an object and which may identify the nature of the object. The properties which are analysed may include the form of patterns in the detected scattered radiation as a function of frequency. The manner in which the detected scattered radiation is analysed is described further below.

The transmitter 104 may be configured to transmit radiation with a first polarisation, and the receiver 106 may be configured to receive radiation with a second polarisation which is orthogonal to the first polarisation. This may be referred to as cross-polarisation detection. Referring to the Cartesian coordinates indicated in FIG. 1, the transmitter 104 may for example be configured to transmit radiation which is polarised in the x-direction and the receiver 106 may for example be configured to receive radiation which is polarised in the z-direction. The Cartesian coordinates in FIG. 1 (and in other figures) are provided to facilitate explanation, and are not intended to imply that the detection system has any particular orientation.

The transmitter 104 and the receiver 106 may both be rotatably mounted, such that they may rotate whilst transmitting and receiving radiation. The rotation may be about an axis which is perpendicular to the polarisation directions of the transmitter 104 and receiver 106 (e.g. about an axis which is parallel to the y-axis). The transmitter 104, frequency multiplier 102, receiver 106 and detector 108 may all be held on a rotatable frame 111 which rotates about an axis parallel to the y-axis. Rotating the receiver 106 and detector 108 using the same frame provides the advantage that their rotations are synchronised (separate synchronisation control is not needed). A microwave sliding joint may be used to channel microwaves from the non-rotating microwave source 100 to the rotating frequency multiplier 102. In other embodiments more or fewer components may be held in the rotatable frame 111. In alternative embodiments the transmitter 104 and receiver 106 may be mounted to rotate separately (i.e. not mounted on a single rotatable frame). Where this is the case, rotation of the transmitter 104 and receiver 106 may be synchronised by a synchronisation control such that the polarisation directions of the transmitter and the receiver remain orthogonal to one another.

In an alternative embodiment, instead of rotating the transmitter 104 and receiver 106, the transmitter and/or receiver may be non-rotating but may include electronics which provide equivalent rotation of their polarisation orientation. An advantage of this embodiment is that it has no moving parts. The electronics may for example utilise Faraday rotation.

The rotation of the transmitter 104 will cause the polarisation of the radiation transmitted by the transmitter to rotate about the y-axis. Similarly, the rotation of the receiver 106 will cause the receiver to detect radiation having a polarisation which rotates about the y-axis. Since the rotation of the receiver 106 is synchronised with the rotation of the transmitter 104, the polarisation direction of the receiver is always orthogonal to the polarisation direction of the transmitter. As a result, the polarisation of detected radiation is always perpendicular to the polarisation of transmitted radiation (i.e. cross-polarisation detection occurs).

The electromagnetic radiation transmitted by the transmitter 104 may have a maximum wavelength which is comparable to or shorter than a long side of an object which is to be detected. The object may for example be concealed on the body of a person. Radiation may be directed onto the person (not shown in FIG. 1) using the transmitter 104 such that at least part of the object is illuminated by the radiation. The intensity of the transmitted radiation is kept within safe operating limits (i.e. such that the health of the person is not affected). The intensity of the transmitted radiation may be selected (at least in part) based upon the sensitivity of the detector 108.

The transmission and detection of radiation may be undertaken remotely from the person monitored (and thus remotely from the object). For example, the transmitter 104 and receiver 106 may be located 1 metre or more from the person being monitored. There is no lower limit on the distance between the transmitter 104 and receiver 106 and the person being monitored. An upper limit of the distance may arise from the effectiveness of focussing optics used to focus the radiation, in combination with the desired cross-sectional area of the radiation at the person being monitored. In some embodiments, possible operating distances for detection system may range from a few tens of centimetres to many tens of metres, and may range from approximately 1 metre to approximately 10 metres or more. The possible operating distances may depend on the frequency of the radiation. This is because some microwave frequencies are attenuated by the atmosphere. Atmospheric windows such as that found around 94 GHz may be chosen to minimise these effects.

The frequency of the radiation may be swept through a frequency range whilst the radiation is incident upon the person being monitored. The range of the frequency sweep determines the depth resolution of the system (measured in the direction of propagation of the radiation). It may therefore be advantageous to maximise the swept range of frequencies to give greater discrimination between objects. The swept range of frequencies may for example correspond with the W band (75-110 GHz; providing a sweep range of 35 GHz). The microwave source 100 may generate microwave radiation with frequencies which are a fraction of the desired frequency range, and the frequency multiplier 102 may multiply the frequency of the radiation such that the desired frequency range is provided. Other wave bands such as the K and Q bands (14-40 GHz; providing a sweep range of 26 GHz) may be used in addition to or instead of the W band. In some instances the microwave source 100 may be capable of generating microwaves having a desired range of frequencies without a frequency multiplier being needed. Where this is the case the frequency multiplier may be omitted from the detection system. The frequency of the radiation may for example extend as high as 300 GHz (radiation above this frequency is not effective at penetrating clothes). The frequency of the radiation may for example extend as low as 40 GHz, may extend as low as 1 GHz, and may extend as low as 0.1 GHz. A swept frequency band of around 10-50 GHz in width within a frequency range of around 40-300 GHz may be used.

Swept frequency radiation may be provided as a continuous change of the frequency of radiation transmitted by the transmitter 104. Alternatively, the swept frequency radiation may comprise a series of steps of the frequency of radiation transmitted by the transmitter 104. At the end of each frequency sweep there may be a break in the radiation before the next sweep is begun. All of these possibilities may be considered to be examples of continuous wave radiation.

The frequency sweep may begin at a low frequency and extend to a high frequency, or may begin at a high frequency and extend to a low frequency. Alternatively, the frequency sweep may pass through different frequencies in a pseudo-random order, a random order, or any other suitable order.

As is explained further above, the transmitter 104 and receiver 106 are configured to rotate such that the polarisation of the radiation transmitted by the transmitter 104 rotates about a line parallel to the y-axis, and the polarisation of the radiation received by the receiver 106 also rotates about a line parallel to the y-axis. The rotation of the transmitter 104 and receiver 106 is synchronised such that receiver polarisation is always orthogonal to the transmitter polarisation (thereby providing cross-polarisation detection).

The transmitter 104 and the receiver 106 are rotated whilst the frequency of the radiation transmitted by the transmitter is swept through a frequency range. A plurality of frequency sweeps and a plurality of full rotations of the transmitter 104 and receiver 106 (i.e. rotation through 360°) may be performed during monitoring of a person.

In an embodiment, the duration of a frequency sweep may be shorter than the duration of a full rotation of the transmitter 104 and receiver 106. Where this is the case a plurality of frequency sweeps may take place during a full rotation of the transmitter 104 and receiver 106. There is no requirement for the frequency sweep and the rotation to be synchronised, and the frequency may therefore have a different value at the start and end of a full rotation.

In an alternative embodiment, the duration of a frequency sweep may be longer than the duration of a full rotation of the transmitter 104 and receiver 106. Again, there is no requirement for the frequency sweep and the rotation to be synchronised.

In a further alternative embodiment, the transmitter 104 and receiver 106 may be rotated in a series of steps (e.g. controlled by stepper motors) through a series of orientations. Where this is done, a frequency sweep may be performed when the transmitter 104 and receiver 106 have a first orientation, then repeated when the transmitter and receiver have a second orientation, etc.

The transmitter 104 and receiver 106 may be rotated through less than 360° (for example instead being rotated through 90°) without significantly reducing the accuracy with which objects are identified. This is explained further below.

A sensor, for example an ultrasonic sensor, or a stereoscopic camera may be used to measure the distance between the transmitter 104 (and receiver 106) and a person being monitored. This distance information may be useful because the cross-sectional shape of the radiation beam may change as the radiation beam propagates, and it is desirable to know the cross-sectional shape of the radiation beam when analysing detected scattered radiation (the cross-sectional shape may influence the manner in which scattering of the radiation occurs).

Figure 2:
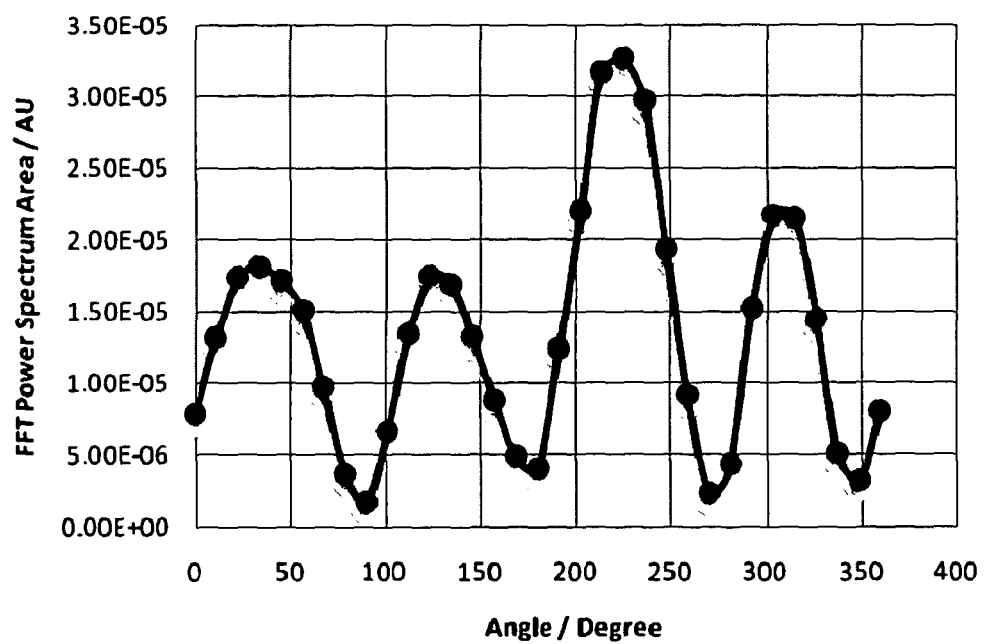
FIG. 2 is a graph which shows the intensity of radiation scattered from a kitchen knife as a function of angle using the object detection system of FIG. 1.

FIG. 2 shows data collected using the detection system shown in FIG. 1. The amplitude of detected radiation scattered from a standard kitchen knife was recorded as a function of the orientation of the transmitter 104. The transmitter 104 and the receiver 106 were both rotated through 360°.

The amplitude response varies as a function of angle θ according to $$\sin\theta\cos\theta = \frac{1}{2}\sin 2\theta$$

(i.e. it is sinusoidally modulated with the argument being twice the angle of rotation). The measured quantity shown in FIG. 2 is proportional to the power of the detected scattered radiation, which is the square of the amplitude response. The shape of the response is indicative of the knife. This is because the knife is anisotropic, being elongated in one direction, and therefore gives rise to significant scattered radiation with a polarisation which is orthogonal to the polarisation of the incident radiation only when the electric field direction does not lie wholly along the length of the knife. The detected scattered radiation is strongest when the polarisation of the incident radiation is oriented at ~45° (with respect to the long axis (blade) of the knife). This is because the incident radiation includes a substantial polarisation component which lies in the plane of the edges of the knife blade and the radiation which is scattered from the knife includes a substantial polarisation component which lies in the plane of the receiver polarisation (the edges of the knife cause polarisation modification when scattering radiation). When the polarisation of the incident radiation is oriented at 0° relative to the knife blade, the detected scattered radiation is at a minimum. This is because although the polarisation of the incident radiation lies in the plane of the edges of the knife blade, and therefore gives rise to significant scattering, the radiation which is scattered from the knife blade does not include a substantial polarisation component which lies in the plane of the receiver polarisation. Similarly, when the polarisation of the incident radiation is oriented at 90° relative to the knife blade, the detected scattered radiation is also at a minimum. This is because the polarisation of the incident radiation is perpendicular to the edges of the knife blade, and the knife blade therefore does not give rise to significant scattering of the incident radiation.

Embodiments of the invention use radiation containing a component having a first polarisation and a second orthogonal polarisation. This is advantageous because it avoids the possibility that the radiation is orthogonal or parallel to a knife (or other anisotropic object).

In addition to including a maximum of detected scattered radiation when the transmitter is oriented to transmit radiation with a polarisation at 45° relative to the knife blade, FIG. 2 also includes maximums when the transmitter is oriented at 135°, 225° and 315°. This is because the reflection of the incident radiation behaves in the same manner when the transmitter has these orientations (the interaction between the radiation and the long edges of the knife is the same). Similarly, minimums of detected scattered radiation are seen when the transmitter is oriented at 180° and 270°. The maximums shown in FIG. 2 have different heights. However, these different heights arise from a misalignment of the radiation relative to the knife during measurement rather than from a property of the detection system itself.

The modulation of the detected scattered radiation shown in FIG. 2 indicates that the knife is either horizontal or vertical (the initial polarisation of the incident radiation was horizontal). If the knife had had a different orientation then the detected scattered radiation would be shifted relative to the horizontal axis, but the characteristic modulated shape of the detected scattered radiation would remain.

The shape of the detected scattered radiation shown in FIG. 2, which arises from the polarisation state of the scattered radiation, is indicative of a knife for the reasons explained above. This shape of scattered radiation may be indicative of other anisotropic objects and is not limited to knives. This is because the long edges (particularly sharp edges) give rise to radiation scattering with an orthogonal polarisation, the strength of this scattering varying as a function of the polarisation of the incident radiation (and the polarisation of the receiver).

An object which is less anisotropic than a knife, for example a handgun, may give rise to detected scattered radiation having a polarisation state which does not give rise to the shape shown in FIG. 2 but which nevertheless gives rise to a shape which allows the object to be identified. Conducting materials with a smooth surface, including the human body, are mainly polarisation conserving. These will thus not give rise to strong cross-polarised detected scattered radiation, and thus will contribute a limited amount of noise to the detected scattered radiation. This may allow objects to be discriminated from the human body.

In general, the manner in which polarised radiation is scattered from an object, and the resulting polarisation state of the scattered radiation, will depend upon the shape of that object. This may be characterised using parameters which are referred to here as scattering parameters. The following treatment confirms from a theoretical point of view the ability of the detection system to distinguish between knives and less anisotropic objects such as handguns.

Scattering parameters are aspect dependent, that is they depend on the orientation of an object relative to the polarisation of the incident radiation. However, a measurement of the scattering parameters in any one aspect allows the derivation of the scattering parameters in any other aspect, and the development of a scattering surface which is aspect independent in either the frequency domain or the time domain (via inverse Fourier transform). The scattering parameters therefore give a mathematical description of the detection system's ability to distinguish an anisotropic scatterer such as a knife from another more isotropic object such as a mobile phone. A measurement of the scattering parameters for a given polarisation of incident radiation may be used to determine the scattering parameters for all other polarisations of incident radiation. The scattering parameters for all polarisations may be determined by the detection system as part of an analysis which identifies an object. However, this is not essential, and the analysis may instead use the scattering parameters of the detected radiation directly.

Figure 3A:
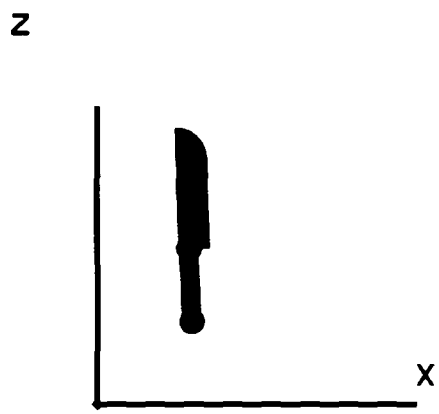
FIG. 3 illustrates two possible orientations of a knife to be detected using the object detection system.
Figure 3B:
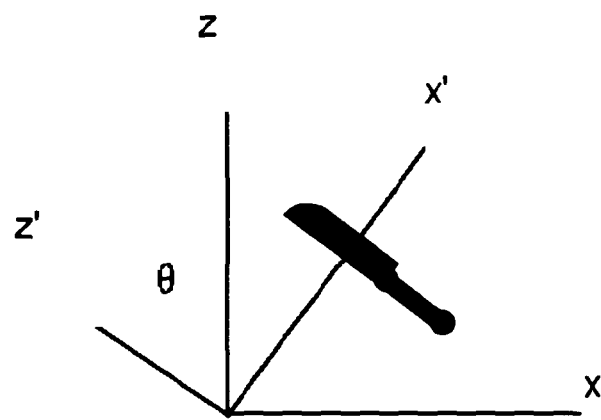

FIG. 3 shows a knife with two different orientations. In FIG. 3a the knife has an arbitrary orientation relative to indicated Cartesian coordinates. In FIG. 3b the knife has been rotated from the arbitrary orientation through an angle θ. A second set of coordinates (primed), which are co-rotated through the angle θ are indicated in FIG. 3b along with the original set of coordinates (unprimed). The primed coordinates allow a scattering parameter matrix (S matrix) for the rotated knife to be equated to the scattering parameter matrix for the unrotated knife.

The scattering from the an object (e.g. the knife) can be expressed as a matrix equation as follows:

$$\begin{bmatrix} E_{-x} \\ E_{-z} \end{bmatrix} = \begin{bmatrix} S_{xx} & S_{zx} \\ S_{xz} & S_{zz} \end{bmatrix} \begin{bmatrix} E_{+x} \\ E_{+z} \end{bmatrix} \quad (1)$$

which is succinctly written as:

$$E_{-} = SE_{+} \quad (2)$$

where $E_{+x}$ and $E_{+z}$ are the incident electric field components (i.e. polarisation) of the radiation in the x and z directions respectively and $E_{-x}$ and $E_{-z}$ are the scattered electric fields.

If the object is now rotated by angle θ we may, without loss of generality, define a new coordinate system (primed) such that the scattering parameter matrix is identical to that in the unprimed coordinate system as given in equation (2) (this is what was done in FIG. 3b).

Hence in the primed coordinate system scattering from the object may be written as:

$$E'_- = SE'_+ \quad (3)$$

The relationship between the E-field vectors (i.e. polarisations) in the primed and unprimed frames (coordinate systems) is easily expressed as:

$$E'_\pm = RE_\pm \quad (4)$$

where R is the rotation matrix given by:

$$R = \begin{bmatrix} \cos\theta & -\sin\theta \\ \sin\theta & \cos\theta \end{bmatrix} \quad (5)$$

Thus by using equations (3) and (4) the scattering equation for the rotated object in the unprimed frame may be determined:

$$E_- = R^{-1} S R E_+ \quad (6)$$

where, $$R^{-1} = \begin{bmatrix} \cos\theta & \sin\theta \\ -\sin\theta & \cos\theta \end{bmatrix}$$

Hence it may be concluded that the S matrix of the object, $S(\theta)$, rotated by angle $\theta$ from its arbitrary zero position, S, is given by the equation:

$$S(\theta) = R^{-1} S R \quad (7)$$

The surface generated by the S matrix $S(\theta)$ of an object over orientation angles of $0° < \theta < 90°$ may uniquely identify the scattering object. A simple explanation of this is described below, followed by consideration of FIGS. 4 to 7, which show surfaces formed from scattering parameters generated using numerical modelling for a kitchen knife and for a revolver type handgun.

The knife may be oriented such that its blade lies along the z-axis (i.e. as shown in FIG. 3a). Two fixed (non-rotating) receivers may be provided, one aligned to only record the z-component of the E field (i.e. radiation having a z-direction polarisation component) the other to only record the x-component of the E-field (i.e. radiation having an x-direction polarisation component). The knife may be illuminated first with z-direction polarised radiation, then with x-direction polarised radiation. No scattered radiation will be received by the receiver which is aligned to record the x-component of the E-field, but scattered radiation will be received by the receiver which is aligned to record the z-component of the E-field. Thus the scattering parameter matrix in this case looks like:

$$S = \begin{bmatrix} 0 & 0 \\ 0 & 1 \end{bmatrix} \quad (8)$$

This is an approximation which is true for a very long thin target where the width is much less than the length. When this approximation applies, according to Equation 7, the scattering parameter for the knife rotated through angle $\theta$ with respect to the z-axis is:

$$S(\theta) = \begin{bmatrix} \sin^2\theta & \sin\theta\cos\theta \\ \sin\theta\cos\theta & \cos^2\theta \end{bmatrix} \quad (9)$$

It may be seen from consideration of Equation 9 that the maximum cross-polarised received scattered radiation is always at 45 degrees, and that the cross-polarised received scattered radiation varies as the function $\sin\theta \cos\theta$.

Since the $S(\theta)$ of Equation 9 is symmetric, only one of the cross-polarised radiation terms is needed in order to determine the presence of an anisotropic object such as the knife. Therefore, it may be possible to determine the presence of an anisotropic object such as the knife by illuminating the knife with radiation having a given polarisation and measuring the scattered radiation in a perpendicular polarisation. However, in order to avoid the situation in which the incident radiation is not scattered from the knife, radiation having polarisation components in more than one orthogonal direction may be required. Similarly, in order to avoid the situation in which no radiation scattered from the knife is detected, receivers having polarisation components in more than one direction may be required (or a single rotating receiver as described further above).

Embodiments of the invention may illuminate an object with radiation having a given polarisation and measure scattered radiation with a perpendicular polarisation to deduce the presence of an anisotropic object such as a knife. Rotation of both a transmitter and perpendicular receiver (e.g. as shown in FIG. 1), together allows the angular dependence of the scattering of radiation by the object to be determined. If the angular dependence is of the form $\sin\theta \cos\theta$ then it may be identified as a knife (or some other strongly anisotropic object). If the angular dependence is not of the form $\sin\theta \cos\theta$ then the object may be something other than a knife.

Figure 4A:
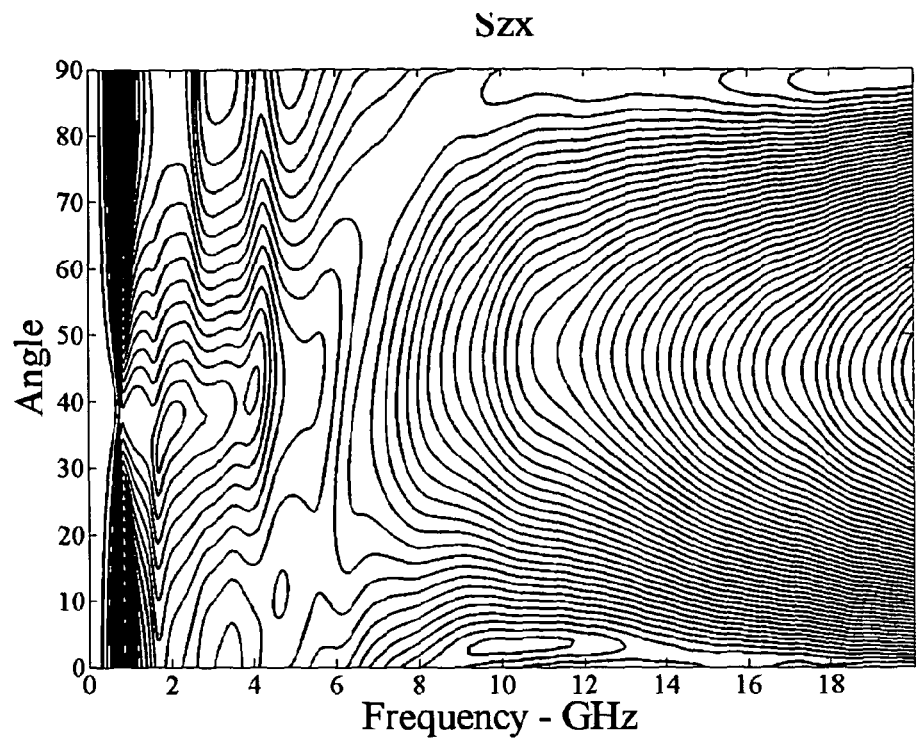
FIG. 4 is a graph which shows the magnitude of cross-polarisation $S_{zx}$ and $S_{xz}$ scattering parameters as simulated for a kitchen knife over the frequency range of 0.1-20 GHz.
Figure 4B:
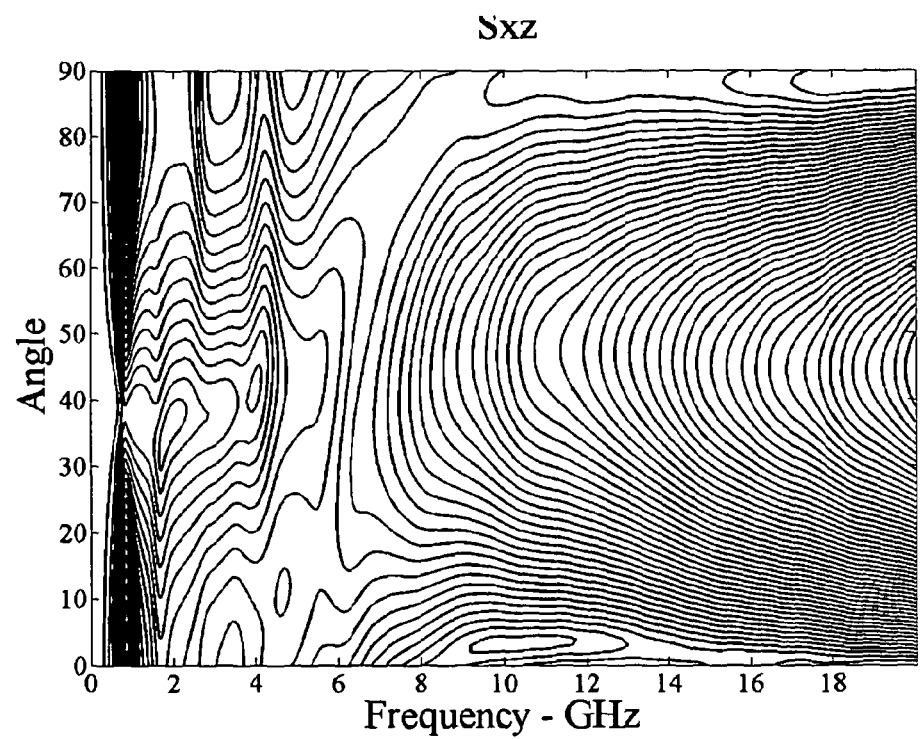

FIG. 4 illustrates the magnitude of the scattering parameters of the kitchen knife as seen for crossed-polarisation detection (i.e. illumination of the kitchen knife using radiation having an E-field vector (polarisation) in a first direction and detection of the E-field vector in an orthogonal direction). The scattering parameters determine the polarisation state of crossed-polarisation detected scattered radiation that will be seen when radiation is directed at the kitchen knife. In FIG. 4a the kitchen knife is illuminated using radiation polarised in the z-direction and radiation polarised in the x-direction is detected. The kitchen knife is rotated through 90° (equivalently, the kitchen knife may be stationary and the E-field vectors may be rotated). The frequency of the radiation is scanned from 0.1 to 20 GHz. This is lower than the range of frequencies that is likely to be used by embodiments of the invention, but is the frequency range which was available in the numerical model. The numerical model provides a surface $S_{zx}$ of scattering parameters which has a form that identifies a strongly anisotropic object, in this case the kitchen knife. FIG. 4a demonstrates that the scattering parameters vary strongly as a function of frequency. At frequencies above around 8 GHz a maximum of the scattering parameters may be seen at 45 degrees, the magnitude of the maximum increasing as the frequency increases. This maximum indicates that the strongest cross-polarised scattering is seen when the kitchen knife is oriented at 45°, for the reasons explained further above in relation to FIG. 2. In FIG. 4b the kitchen knife is illuminated using radiation polarised in the x-direction and radiation polarised in the z-direction is detected. This provides a surface $S_{zx}$ of scattering parameters. As can be seen from comparison of FIGS. 4a and 4b, the surface of scattering parameters is the same as the surface of the scattering parameters in FIG. 4a. The maximum at 45° again indicates that the strongest cross-polarised scattering is seen when the kitchen knife is oriented at 45°. A strong maximum of the kind shown in FIGS. 4a and 4b is indicative of a strongly anisotropic object such as a kitchen knife.

The simple shape of the surface of the scattering parameters shown in FIG. 4 is indicative of an object which is strongly anisotropic and which is symmetric (or substantially symmetric) about its axis. Detection of scattering radiation with an intensity which varies in the manner shown in FIG. 4 (or a similar manner) may indicate the presence of a knife. Thus, detection of scattered radiation which varies as sin θ cos θ (or a similar form) as a function of angle may indicate the presence of a knife. Other objects which are less simple in shape than a knife and which are less anisotropic may give rise to a more complex surface of cross-polarised scattering parameters, for example as discussed further below in relation to FIG. 6.

Figure 5A:
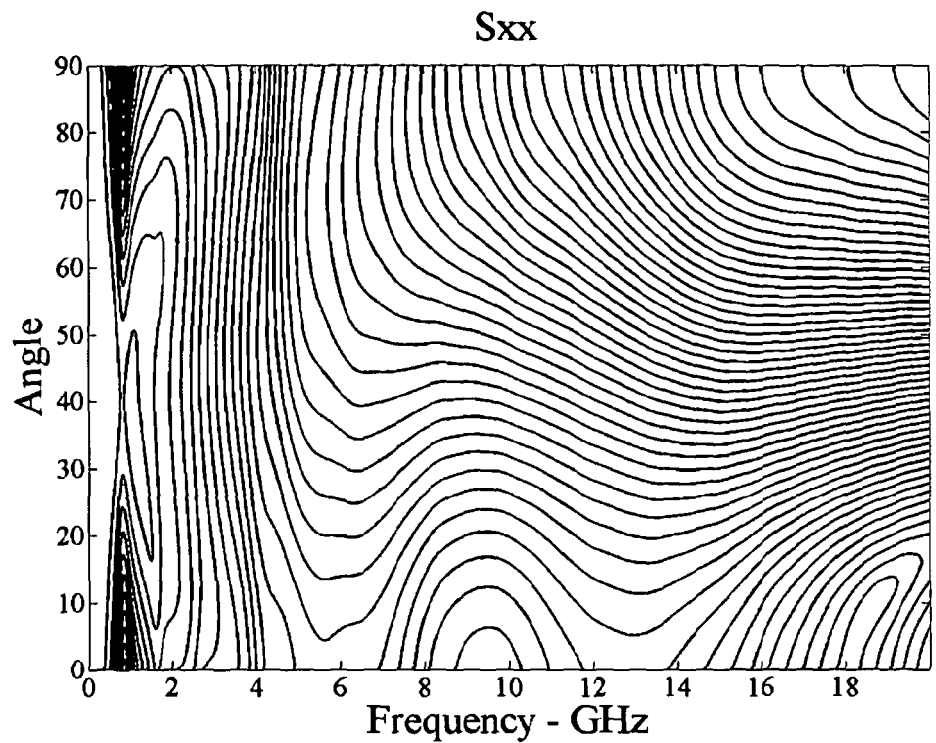
FIG. 5 is a graph which shows the magnitude of co-polarisation $S_{xx}$ and $S_{zz}$ scattering parameters as simulated for the kitchen knife over the frequency range of 0.1-20 GHz.
Figure 5B:
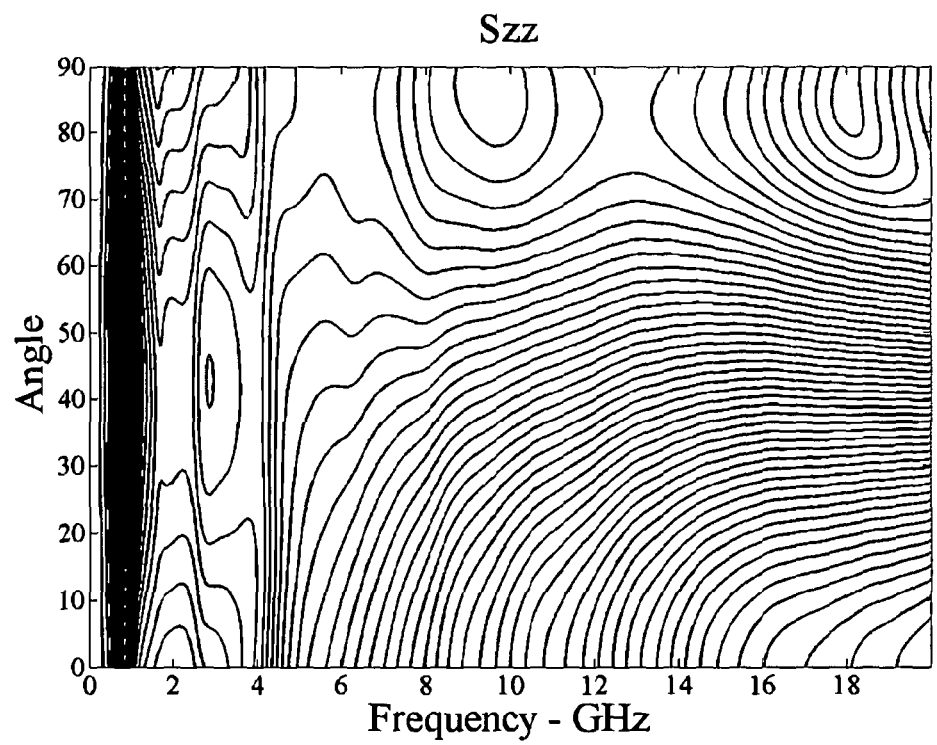

FIG. 5 illustrates the magnitude of the scattering parameters of the kitchen knife as seen for co-polarisation detection (i.e. illumination of the object using radiation having an E-field vector (polarisation) in a first direction and detection of the E-field vector in the same direction). In FIG. 5a the kitchen knife is illuminated using radiation polarised in the x-direction and radiation polarised in the x-direction is detected. The frequency of the radiation is scanned from 0.1 to 20 GHz, and the kitchen knife is rotated through 90°. It can be seen that at frequencies above around 8 GHz a maximum is seen when the knife is oriented in the x-direction. In FIG. 5b the kitchen knife is illuminated using radiation polarised in the z-direction and radiation polarised in the z-direction is detected. It can be seen that at frequencies above around 8 GHz a maximum is seen when the knife is oriented in the z-direction. Strong maximums of the kind shown in FIGS. 5a and 5b are indicative of a strongly anisotropic object such as a kitchen knife (strong co-polarised scattering is seen when the polarisation has a large component that is parallel to the long direction of the anisotropic object).

Figure 6A:
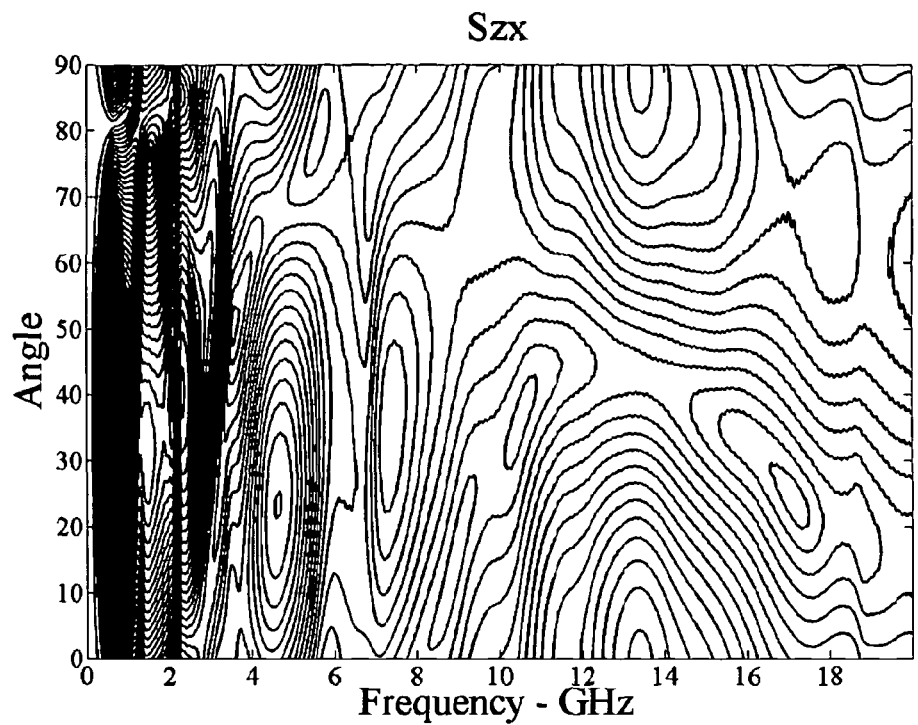
FIG. 6 is a graph which shows the magnitude of cross-polarisation $S_{zx}$ and $S_{xz}$ scattering parameters as simulated for a revolver type handgun over the frequency range of 0.1-20 GHz.
Figure 6B:
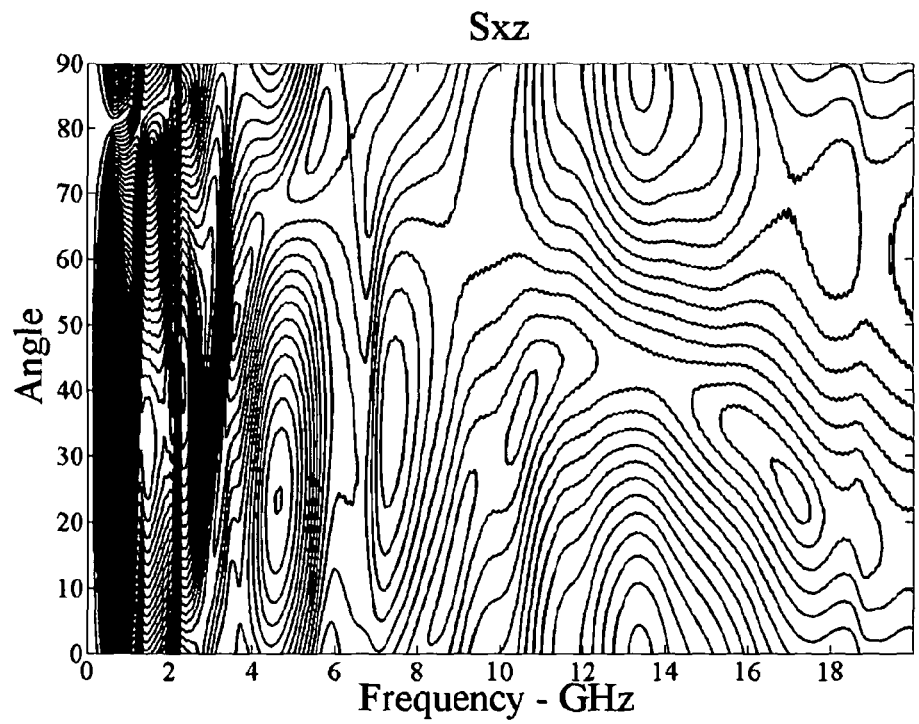

FIG. 6 illustrates the magnitude of the scattering parameters of a revolver type handgun as seen for crossed-polarisation detection. In FIG. 6a the handgun is illuminated using radiation polarised in the z-direction and radiation polarised in the x-direction is detected. The handgun is rotated through 90° and the frequency of the radiation is scanned from 0.1 to 20 GHz. The scattering parameters vary strongly as a function of frequency, and provide a surface of $S_{zx}$ scattering parameters which has a form that may identify the revolver type handgun. Peaks are seen in the surface of scattering parameters at different frequencies and for different orientations of the handgun. These peaks correspond to scattering of the radiation by parts or features of the handgun, the strength of the scattering depending on the size and orientations of those parts or features of the handgun. Since the handgun has many parts or features, at least one of these parts or features is likely to provide significant cross-polarised scattering for a given orientation of the handgun. In FIG. 6b the revolver type handgun is illuminated using radiation polarised in the x-direction and radiation polarised in the z-direction is detected. This provides a surface of $S_{zx}$ scattering parameters. As can be seen from comparison of FIGS. 6a and 6b, the surface of scattering parameters in FIG. 6b is the same as the surface of the scattering parameters in FIG. 6a. Thus, the surfaces of scattering parameters may be used to identify the revolver type handgun.

Figure 7A:
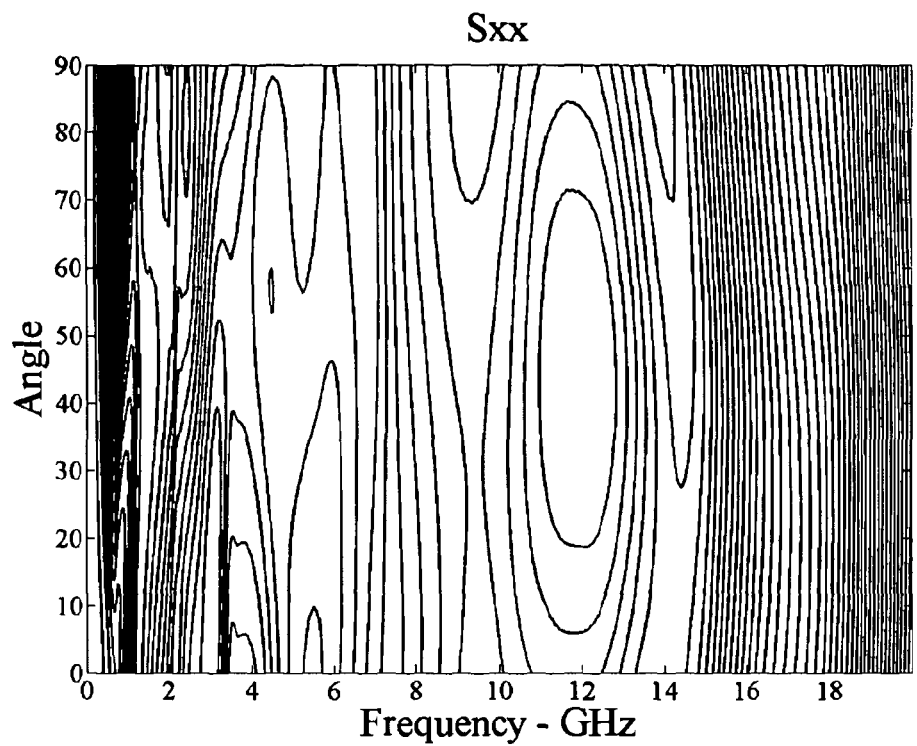
FIG. 7 is a graph which shows the magnitude of co-polarisation $S_{xx}$ and $S_{zz}$ scattering parameters as simulated for the revolver type handgun over the frequency range of 0.1-20 GHz.
Figure 7B:
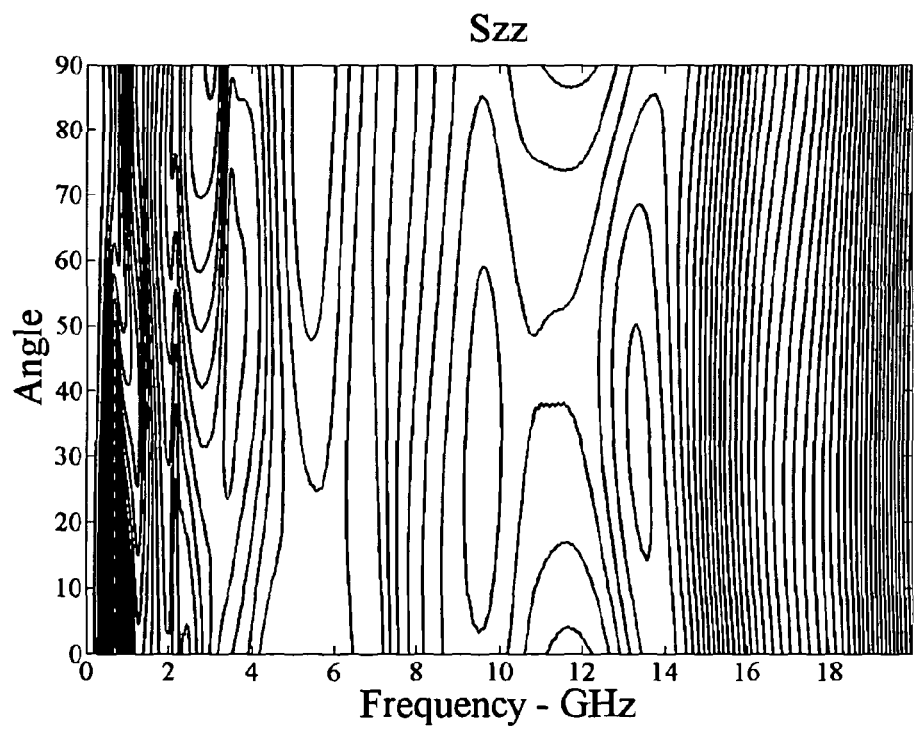

FIG. 7 illustrates the magnitude of the scattering parameters of the revolver type handgun as seen for co-polarisation detection (i.e. illumination of the object using radiation having an E-field vector (polarisation) in a first direction and detection of the E-field vector in the same direction). The handgun is rotated through 90° and the frequency of the radiation is scanned from 0.1 to 20 GHz. The surfaces of the scattering parameters in FIGS. 7a and 7b do not include distinctive peaks of the type seen in FIGS. 6a and 6b. This demonstrates that co-polarisation detection may be less suited than cross-polarisation detection to identifying objects, particularly anisotropic objects. In addition, cross-polarisation detection may provide better discrimination of an object from the body of a person carrying the object (compared with co-polarisation detection), because the radiation scattered by the body will be dominated by co-polarised radiation. Co-polarisation detection may be used in combination with cross-polarisation detection. This may aid discrimination of an object from the body of a person carrying the object than would be achievable using only cross-polarisation detection.

FIGS. 4 to 7 demonstrate that the shape of an object has a strong effect on the scattering parameters of that object (and thus on the polarisation state of scattered radiation), and that the scattering parameters may be used to identify an object (via analysis of the polarisation state of detected scattered radiation). The objects used in the simulations of FIGS. 4 to 7 were relatively anisotropic. Objects which are relatively isotropic, such as mobile phones, have scattering parameters which do not vary strongly as a function of orientation angle. This allows discrimination of isotropic objects from anisotropic objects.

Various methods may be used to identify an object based upon detected scattered radiation. The methods may be based upon comparison of detected scattered radiation with scattered radiation previously recorded (or simulated) for known objects. The comparison may use a pattern recognition algorithm or any other suitable technique. Initial processing may be performed before the comparison is made. The initial processing may include for example adjusting the detected scattered radiation based upon the measured distance between the transmitter 104 (and receiver 106) and the person being monitored. As mentioned further above, this distance may be measured using a separate sensor such as an ultrasonic sensor.

In an embodiment, a pattern recognition algorithm may be used to identify objects based upon detected cross-polarised scattered radiation (and possibly also detected co-polarised scattered radiation). The pattern recognition algorithm may be provided with information relating to the distance between the transmitter (and receiver) and a target (this may be referred to as the range). The pattern recognition algorithm may be provided with detected scattered radiation received at a number of different polarisation orientations. The algorithm may be applied to a pattern recognition system such as an artificial neural network (or equivalent software). An example of how a pattern recognition algorithm may be used is described further below.

Figure 8:
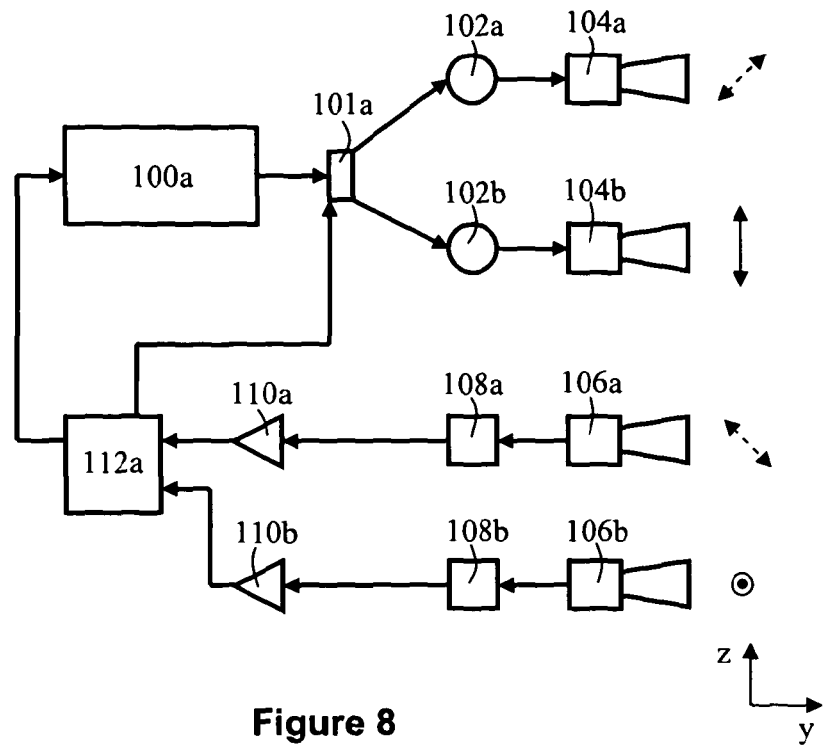
FIG. 8 is a schematic diagram which shows an object detection system according to an alternative embodiment of the invention.

FIG. 8 is a schematic diagram of an object detection system according to an alternative embodiment of the invention. In common with the embodiment shown in FIG. 1, this embodiment of the invention uses direct detection (i.e. does not detect the phase of scattered radiation). Unlike the embodiment of FIG. 1 however, the detection system does not have a rotatably mounted transmitter and a rotatably mounted receiver, but instead has multiple fixed transmitters and multiple fixed receivers. Other components of the detection system may operate in manner which is equivalent to that described above in relation to FIG. 1.

The detection system comprises a microwave source 100a which is configured to generate microwave radiation and direct it via frequency multipliers 102a,b to gain horns that act as transmitters 104a,b. Referring to the Cartesian coordinates indicated in FIG. 8, the first transmitter 104a is configured into transmit radiation having a polarisation which is parallel to the line x=z (indicated as a dotted line which has been rotated about the z-axis for illustrative purposes only). The second transmitter 104b is configured to transmit radiation with a polarisation parallel to the z-axis. A microwave switch 101a is located between the microwave source 100a and the frequency multipliers 102a,b, the switch being configured such that it either directs radiation towards the first frequency multiplier 102a (and hence the first transmitter 104a) or towards the second frequency multiplier 102b (and hence the second transmitter 104b).

The detection system further comprises two gain horns which act as receivers 106a,b. Each receiver 106a,b is connected to a detector 108a,b, and each detector is connected an amplifier 110a,b. Outputs from the amplifiers 110a,b pass to a computer 112a (or other data capturing and processing apparatus). The first receiver 106a is configured to receive radiation which has a polarisation oriented parallel to the line x=−z (indicated as a dotted line which has been rotated about the z-axis for illustrative purposes only). The second receiver 106b is configured to detect radiation which has a polarisation parallel to the x-axis.

As is explained further above, the Cartesian coordinates are not intended to imply that the detection system has a particular orientation. The first transmitter 104a may have any orientation, and the second transmitter 104b may have an orientation which is such that it transmits radiation having a polarisation rotated by for example 45° relative to the radiation transmitted by the first transmitter. Similarly, the first receiver 106a may have an orientation which is orthogonal to the first transmitter 104a, and the second receiver 106b may have an orientation with is orthogonal to the second transmitter 104b.

The computer 112a is connected to the microwave source 100a and the switch 101a, and is configured to control their operation.

In use, the computer 112a controls the microwave source 100a and switch 101a such that swept frequency radiation is transmitted at different times by the first and second transmitters 104a,b. The computer also controls recording of detected scattered radiation and stores detected data in a manner which allows it to be associated with radiation frequencies and polarisations that were being transmitted when the data was detected.

The frequency range of the swept frequency may correspond with that described further above in relation to FIG. 1. The frequency multipliers 102a,b are optional for the reason explained further above in relation to FIG. 1.

In an embodiment, the detection system of FIG. 8 may be operated as follows:

1. Control the switch 101a such that radiation is directed towards the second frequency multiplier 102b and second transmitter 104b, and generate a frequency sweep of radiation using the microwave source 100a. The second transmitter 104b thus transmits radiation with a polarisation parallel to the z-axis over a desired range of frequencies.

2. Detect scattered radiation which is received at the second detector 106b (i.e. which has a polarisation parallel to the x-axis) during the frequency sweep, and record the detected scattered radiation in the computer 112a.

3. Control the switch 101a such that radiation is directed towards the first frequency multiplier 102a and first transmitter 104a, and generate a frequency sweep of radiation using the microwave source 100a. The first transmitter 104a thus transmits radiation having polarisation parallel to the line x=z over a desired range of frequencies.

4. Detect scattered radiation which is received at the first detector 106a (i.e. which has a polarisation parallel to the line x=−z) during the frequency sweep, and record the detected scattered radiation data in the computer 112a.

The embodiment of the invention shown in FIG. 8 does not provide crossed-polarisation detection for transmitted radiation having polarisation which rotates through 360 degrees (as is provided by the system of FIG. 1), but instead only provides crossed-polarisation detection for two polarisation orientations which are separated by 45°. This may provide sufficient detected scattered radiation to allow objects to be identified, as is explained below.

Referring again to FIG. 4, when an anisotropic object is illuminated using polarised radiation and scattered radiation having an orthogonal orientation is detected, the detected scattered radiation varies according to distinctive scattering parameters. At frequencies above around 8 GHz (in this example) the intensity of scattered radiation detected at the detector is low if the polarisation of the incident radiation is parallel with or orthogonal to the anisotropic object. The intensity of the scattered radiation increases as the angle between polarisation of the incident radiation and the object increases, and passes through maximum at around 45°, and then decreases to a minimum when the polarisation of the incident radiation is perpendicular to the anisotropic object. The detection system shown in FIG. 8 transmits radiation having two linear polarisations which are separated by an angle of 45°. Referring again to FIG. 4, this is equivalent to gathering data at two angles which are separated by 45° and not gathering data at any other angle. The specific angles at which data is gathered will depend upon the orientation of the anisotropic object which is illuminated by the radiation.

In one example, the object is parallel to the z-axis, and radiation transmitted by the second transmitter 104b is polarised parallel to the z-axis. This is equivalent to detecting radiation in FIG. 4 along a line which corresponds to an angle θ°, and little or no useful scattered radiation is detected. In this example however, the first transmitter 104a transmits radiation having a polarisation which oriented at 45° relative to the orientation of the anisotropic object. This is equivalent to collecting data at an angle of 45° in FIG. 4, and will provide a substantial amount of useful scattered radiation. Consideration of FIG. 4 will confirm that the data measured at 0° and 45° should allow the anisotropic object to be identified as a knife, since the data will be characteristic of the scattering parameters of the knife.

If the knife has some other orientation then the scattered radiation data will not be collected at angles of 0° and 45° but will instead be collected at two other angles which are separated by 45°. Again, consideration of FIG. 4 will indicate that this data should allow the anisotropic object to be identified as a knife due to the distinctive scattering parameters of the knife.

As explained further above, determining the scattering parameters of an object in any one aspect allows the derivation of the scattering parameters in any other aspect, and the development of a scattering surface which is aspect independent. Thus, cross-polarisation detection of scattered radiation may allow an object to be identified irrespective of the orientation of that object, provided that scattered radiation with a significant amplitude is detected. The 45° separation between the first and second transmitters 102a,b, and between associated detectors 106a,b, ensures that scattered radiation with a significant amplitude will be detected by at least one of the detectors. Other angular separations may be provided between the first and second transmitters 102a,b, and between associated detectors 106a,b, provided that the angular separation is such that scattered radiation with a significant amplitude will be detected by at least one of the detectors.

As explained above, the knife can be identified using the detection system of FIG. 8 irrespective of the orientation in which the knife is held. Other objects may be identified by the detection system of FIG. 8 in the same manner, as may be seen for example by considering the scattering parameter surfaces shown in FIG. 6.

Figure 9:
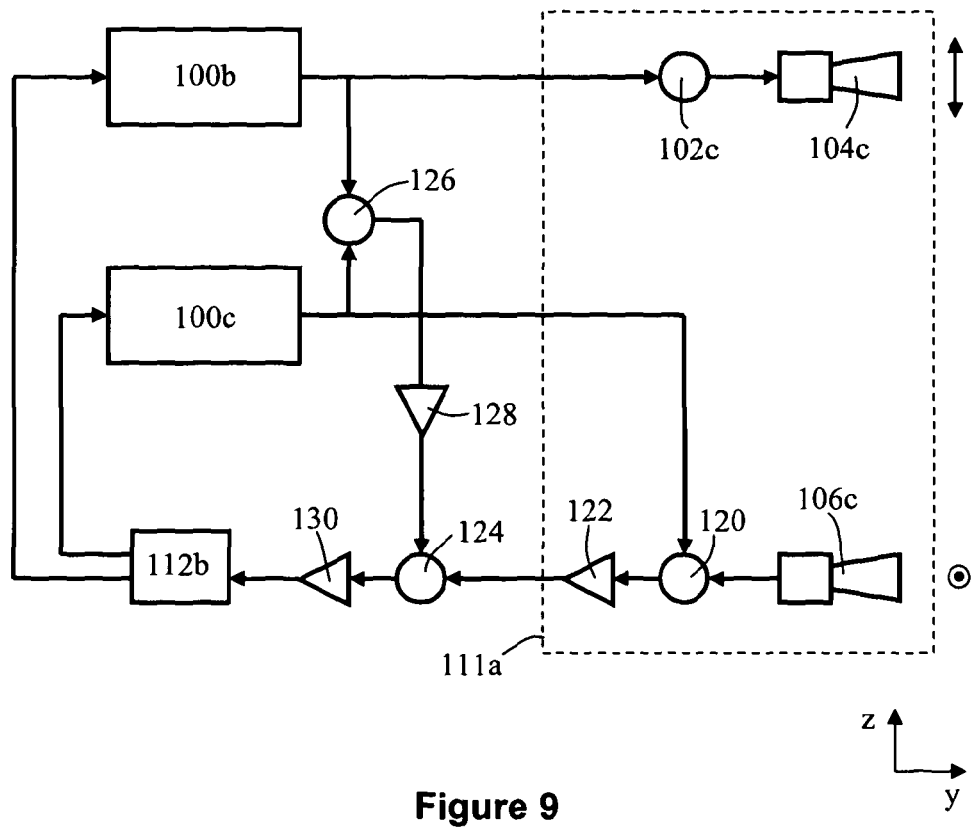
FIG. 9 is a schematic diagram which shows an object detection system according to a further alternative embodiment of the invention.

FIG. 9 is a schematic diagram of an object detection system according an alternative embodiment of the invention. In contrast with embodiments depicted in FIGS. 1 and 8, this embodiment detects both the amplitude and phase of scattered radiation (the embodiments shown in FIGS. 1 and 8 detect only the amplitude of the radiation). Detection of the amplitude and phase of the scattered radiation may be referred to as quadrature detection.

The detection system includes first and second microwave sources 100b,c. Operation of the microwave sources 100b,c is controlled by a computer 112b (or other control apparatus). An output from the first microwave source 100b passes via a frequency multiplier 102c to a gain horn which is configured to act as a transmitter 104c. The transmitter 104c may include focussing optics. The detection system further comprises a second gain horn which is configured to act as a receiver 106c. The receiver 106c is oriented transverse to the transmitter 104c such that it receives radiation having a polarisation perpendicular to the radiation transmitted by the transmitter.

An output from the receiver 106c passes to a sub-harmonic mixer (SHM mixer) 120. The SHM mixer 120 also receives radiation from the second microwave source 100c, and mixes the received radiation with the radiation from the second microwave source 100c to generate a product of these signals, then converts this product to an electrical signal. The electrical signal is amplified by an amplifier 122 and then passes to a radio frequency mixer (RF mixer) 124. The RF mixer 124 also receives a second signal. This second signal is generated by mixing outputs of the first and second microwave sources 100b,c using a microwave mixer (MW mixer) 126 and then amplifying the resulting electrical signal using an amplifier 128. The signal which is output by the RF mixer 124 comprises an 'in phase' part and a 'quadrature' part. The signal passes via an amplifier 130 to the computer 112b where the signal may be stored and analysed.

The transmitter 104c and the receiver 106c may both be rotatably mounted, such that they may rotate whilst transmitting and receiving radiation. The rotation may be about an axis which is perpendicular to the polarisation directions of the transmitter 104c and receiver 106c (e.g. about an axis which is parallel to the y-axis). The transmitter 104c, frequency multiplier 102c, receiver 106c, SHM mixer 120 and amplifier 122 may all be held on a rotatable frame 111a which rotates about an axis parallel to the y-axis. Rotating the transmitter 104c and receiver 106c using the same frame provides the advantage that their rotations are synchronised (separate synchronisation control is not needed). A microwave sliding joint may be used to channel microwaves from the non-rotating microwave source 100b to the rotating frequency multiplier 102c. In other embodiments more or fewer components may be held in the rotatable frame 111a. In alternative embodiments the transmitter 104c and receiver 106c may be mounted to rotate separately (i.e. not mounted on a single rotatable frame). Where this is the case, rotation of the transmitter 104c and receiver 106c may be synchronised by a synchronisation control such that the polarisation directions of the transmitter and the receiver remain orthogonal to one another.

In an alternative embodiment, instead of rotating the transmitter 104c and receiver 106c, the transmitter and/or receiver may be non-rotating but may include electronics which provide equivalent rotation of their polarisation orientation. An advantage of this embodiment is that it has no moving parts. The electronics may for example utilise Faraday rotation.

In use, the computer 112b may cause the first and second microwave sources 100b,c to generate microwaves with swept frequencies. The frequency of the microwave radiation emitted by the second microwave source 100c may be separated from the frequency of the radiation emitted by the first microwave source 100b by a fixed frequency amount. This fixed frequency separation may for example be in the range 100-400 MHz.

In an embodiment, the first microwave source 100b may be configured to provide a frequency sweep which ranges from 12.5 GHz to 18 GHz (the second microwave source 100c may be configured to provide an equivalent frequency sweep). The frequency multiplier 102c may be configured to multiply the frequency of the radiation of the radiation by a factor of around 6, such that the frequency of the radiation transmitted by the transmitter 104c ranges from 75 GHz to 108 GHz. In an alternative embodiment the frequency multiplier 102c may be omitted. Any suitable frequency sweep may be generated by the microwave sources 100b,c.

The combination of the SHM mixer 120, RF mixer 124 and MW mixer 126 allow the phase of the scattered radiation received by the receiver 106c to be measured together with the amplitude of the radiation.

Analysis of the received radiation may be performed in an equivalent manner to the analysis described further above in relation to the embodiments depicted in FIGS. 1 and 8. However, in addition the phase information may be used to provide initial processing of the data.

The initial processing of the data may comprise using range information to remove from the data radiation which is not scattered by the target (e.g. a person being monitored) or an object carried by the target, but was instead scattered from some other location (e.g. a wall located in the background). The range data may be obtained by performing an inverse Fourier transform on the received amplitude and phase data.

The initial processing of the data may further comprise adjusting the detected scattered radiation such that reflections from the torso of the person being monitored are aligned. Features which indicate the torso may be identified in the detected scattered radiation, for example by identifying where the detected scattered radiation reaches half of a maximum value. The detected scattered radiation may then for example be aligned by the leading edge of the torso scattered radiation. An object which is being carried by the person being monitored will usually appear at a closer distance (range) that the torso.

Once the above initial processing steps have been performed, the data may be analysed using a suitable analysis method. The analysis method may for example include a pattern recognition system. The analysis may look for patterns in the frequency response of the received scattered radiation which are characteristic of an object or objects being looked for.

A pattern recognition system such as an artificial neural network (or equivalent software) may be used to distinguish objects based upon detected cross-polarised scattered radiation. An embodiment of the invention may use a back propagation feed forward neural network. Neural networks of this type will be known to those skilled in the art, and are therefore not described in detail here. Fourier transformed input data may be provided to the neural network, the input data comprising both cross-polarised detected scattered radiation and co-polarised detected scattered radiation. Some initial processing may be applied to the data, such as removing background signals and rescaling data to take account of distance between the transmitter (and receiver) and the person being monitored. The neural network may generate an output which distinguishes an object based upon a single frequency sweep. A plurality of outputs may be generated in this manner, the most common output being identified as being the correct output. In an alternative approach, the neural network may generate an output which distinguishes an object based upon a plurality of frequency sweeps. Where this is done, the neural network may apply some temporal analysis. Some flat objects without obvious sharp edges such as mobile phones can cause very short temporal glints. It may be possible to remove the effects of these using the neural network analysis based upon a plurality of frequency sweeps. A neural network may "learn" typical scattering responses for a range of objects, including threat objects (e.g. knives or guns). This may be done by adjusting the weights applied to connections to the neural network. The number of weights may be selected such that the neural network operates in sufficiently general manner that it may identify classes of objects (e.g. guns) rather than only identifying a specific model of an object (e.g. providing a positive output for one model of gun but not providing a positive output for other models of gun). In the table below, a detection system described in FIG. 9 was used to detect radiation scattered from a range of objects carried on a person's body, and also to detect radiation scattered by the body alone. The objects included a camera, a Glock® handgun, a large kitchen knife, an Olympic starter's pistol, and a small knife. In each case the frequency of the radiation was swept 75 times from 14-40 GHz. The orientation of the person and the object was slightly different during each frequency sweep. A discrete inverse Fourier transform of the received data was applied. The neural network then classified the individual output of each frequency sweep. In this case the neural network has several outputs, from which a score of 1 on a pre-designated output was produced for each object identified. A score of the outputs for the 75 sweeps was recorded.

In Table 1 the first seven lines of outputs were recorded during training of the neural network, and the remaining lines of outputs were recorded after training. Due to limited space the output columns are not labelled. The output columns are in the following order: body only, body and camera, body and Glock® handgun, body and large knife held at 45° to the horizontal, body and large knife held vertically, body and Olympic gun, body and small knife held at 45° degrees to the horizontal, and body and small knife held horizontally.

The accuracy with which the object (or absence of an object) was identified by the detection system is indicated as a percentage. It can be seen that the detection system provides accurate identification of the object (or the absence of the object) in each case. Although individual frequency sweeps give rise to a wrong identification in some instances, using 75 frequency sweeps allows wrong identifications (which are small in number) to be discriminated from correct identifications (which are higher in number).

In an embodiment, the detection system may be configured merely to identify whether or not an object is being carried by a target. In an embodiment, the detection system may be configured merely to determine whether the object is a threat object (e.g. gun or knife) or is a non-threat object (e.g. camera or mobile phone). In an embodiment, the detection system may be configured to identify the object (as described above).

Figure 10:
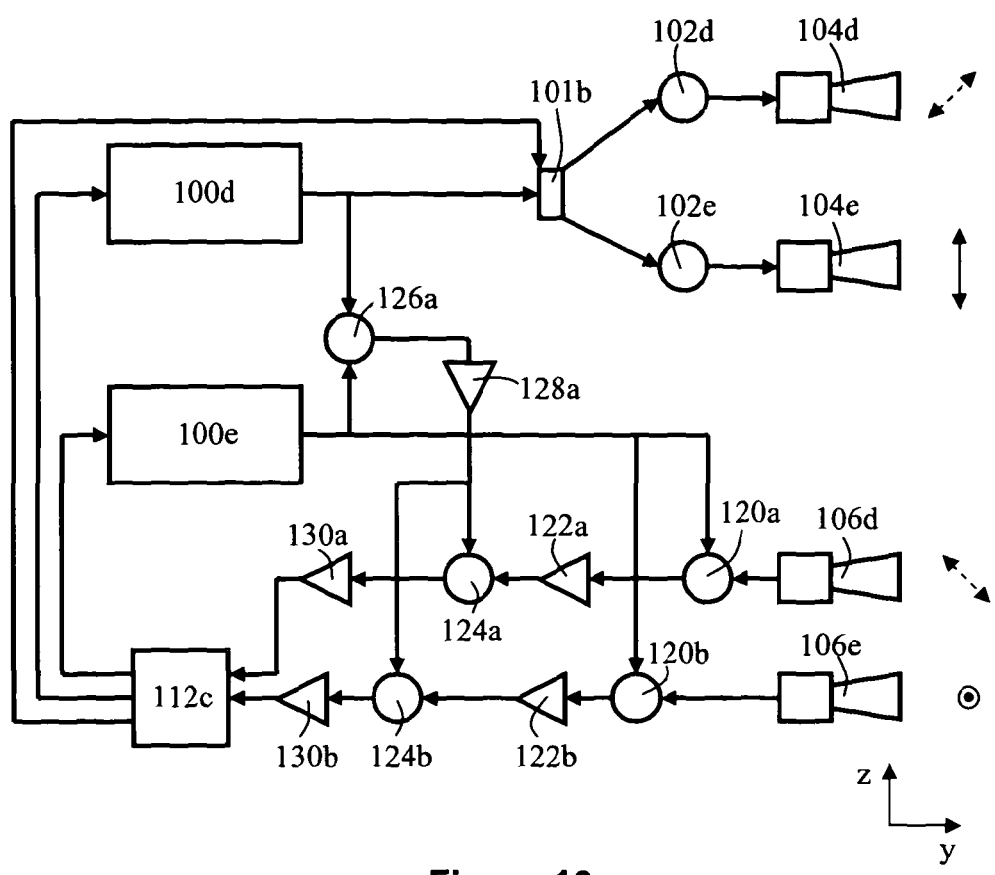
FIG. 10 is a schematic diagram which shows an object detection system according to a further alternative embodiment of the invention.

FIG. 10 is schematic diagram of an object detection system according to an alternative embodiment of the invention. The object detection system may be considered to be a combination of the object detection system shown in FIGS. 8 and 9, and for this reason is not described in detail. The detection system comprises first and second microwave sources 100d,e which are configured to generate radiation in the same manner as described above in relation to FIG. 9. A microwave mixer 126a and amplifier 128a mix radiation output by the first and second microwave sources 100d,e and amplifies the resulting electrical signal. A switch 101b which is controlled by a computer 112c directs radiation via (optional) frequency multipliers 102d,e to transmitters 104d,e. These may be configured in the same manner as described above in relation to FIG. 8.

Receivers 106d,e may be configured to receive scattered radiation in the same manner as described in relation to FIG. 8. A first sub-harmonic mixer 120a mixes the received radiation with radiation from the second microwave source 100e to

TABLE 1

Neural Network Outputs

| | Data used for Training | Data used for Testing | Score/75 | | | | | | | Percent % | Comments |
|---|---|---|---|---|---|---|---|---|---|---|---|
| Body1 | * | * | 75 | 0 | 0 | 0 | 0 | 0 | 0 | 100 | Body |
| Body1 + Camera | * | * | 1 | 68 | 0 | 1 | 2 | 1 | 2 | 91 | Camera |
| Body1 + Glock | * | * | 0 | 0 | 75 | 0 | 0 | 0 | 0 | 100 | Glock |
| Body1 + Large Knife 45° | * | * | 1 | 0 | 0 | 74 | 0 | 0 | 0 | 99 | Large Knife |
| Body1 + Large Knife Vert | * | * | 0 | 0 | 0 | 0 | 75 | 0 | 0 | 100 | Large Knife |
| Body1 + Olympic Gun | * | * | 0 | 0 | 0 | 0 | 0 | 75 | 0 | 100 | Olympic Gun |
| Body1 + Small Knife 45° | * | * | 0 | 0 | 0 | 0 | 0 | 0 | 75 | 100 | Small Knife |
| Body1 + Small Knife Hor | | * | 14 | 4 | 0 | 1 | 4 | 0 | 52 | 69 | Small Knife |
| Body2 | | * | 69 | 0 | 0 | 1 | 5 | 0 | 0 | 92 | Body |
| Body2 + Camera | | * | 0 | 65 | 2 | 2 | 3 | 0 | 3 | 87 | Camera |
| Body2 + Glock | | * | 0 | 1 | 66 | 0 | 0 | 7 | 1 | 88 | Glock |
| Body2 + Large Knife 45° | | * | 9 | 1 | 0 | 58 | 1 | 0 | 6 | 77 | Large Knife |
| Body2 + Large Knife Vert | | * | 10 | 4 | 0 | 3 | 39 | 0 | 19 | 77 | Large Knife or small knife |
| Body2 + Olympic Gun | | * | 0 | 1 | 6 | 6 | 0 | 62 | 0 | 83 | Olympic Gun |
| Body2 + Small Knife 45° | | * | 2 | 7 | 0 | 3 | 5 | 0 | 58 | 77 | Small Knife |
| Body2 + Small Knife Hor | | * | 9 | 4 | 0 | 0 | 2 | 0 | 60 | 80 | Small Knife |
| Body3 | | * | 58 | 3 | 0 | 3 | 1 | 0 | 10 | 77 | Body | generate a product of these signals, then converts this product to an electrical signal. A second sub-harmonic mixer 120b performs the same operation for the second receiver 106e. The resulting electrical signals are amplified by amplifiers 122a,b and are then mixed using radio frequency mixers 124a,b with the signal output from the microwave mixer 126a. The resulting signals are amplified by amplifiers 130a,b and are stored by the computer 122c.

Operation of the detection system of FIG. 10 may correspond with operation of the detection system of FIG. 8. However, in addition to the amplitude of scattered radiation being recorded, the phase of the scattered radiation is also recorded. This allows initial processing of received scattered radiation data to be performed, for example to take into account range information or the position of the torso of a person being monitored.

In an embodiment, instead of rotating both the transmitter and the receiver (e.g. as shown in FIGS. 1 and 9), the receiver may be static and the transmitter may be rotating. Where this is the case, more than one receiver may be provided. The receivers may comprise two orthogonally configured receivers (i.e. a first receiver configured to receive radiation having a first linear polarisation and a second receiver configured to receiver radiation having a second orthogonal linear polarisation).

In an embodiment, transmitter may be static and a rotating polariser may be used to apply a polarisation rotation to radiation emitted by the transmitter. For example, the transmitter may be configured to transmit linearly polarised radiation (e.g. polarised parallel to the x-axis). A set of wires aligned in the same direction may be positioned such that they intersect with the radiation, the set of wires being driven to rotate about an axis which is substantially parallel to the direction of propagation of the radiation. The set of wires may for example be positioned between a horn of the transmitter and focussing optics. The separation between the wires may be selected such that the wires modify the polarisation of the radiation. The separation between the wires may for example be $1/10^{th}$ of the minimum wavelength of the radiation (or some other suitable separation). When the wires are parallel to the x-axis they will not change the polarisation of the radiation. However, when the wires subtend an angle relative to the x-axis they will rotate the polarisation of the radiation to that angle. This is caused by the wires absorbing the radiation and then re-emitting it. The amplitude of the radiation will vary according to cos θ, where θ is the angle subtended by the wires relative to the x-axis (in this example).

One or more receivers may be arranged to receive radiation scattered from an object when radiation polarised by the rotating wires is incident upon it (e.g. two orthogonally configured receivers). The receivers may be connected to detectors which are configured to only detect radiation when the wires have orientations which lie within particular ranges. For example, the detectors may only detect radiation when the angle subtended between the wires and the x-axis is between 315° and 45° or between 135° and 225° (or other ranges of angles). This may ensure that radiation is not detected when the rotating wires are emitting radiation with a relatively low amplitude (detecting scattered radiation arising from relatively low amplitude emitted radiation may give rise to a poor signal to noise ratio). The minimum amplitude of radiation emitted by the wires in the ranges 315° to 45° and 135° to 225° is 0.707 (when the maximum amplitude is normalised to 1).

In an alternative arrangement, instead of only detecting scattered radiation when the wires have particular orientations, scattered radiation is detected for all orientations of the wires, but processing of the detected scattered radiation only uses radiation detected when the wires have particular orientations.

The combination of rotating wires and a static receiver may be simpler and easier to construct than a rotating receiver.

In embodiments in which the transmitter is rotating (or wires are rotating) and the receivers comprise a pair of orthogonally oriented receivers, the detected scattered co-polarised radiation and cross-polarised radiation can be obtained from the detected radiation by applying the following transformations:

$$D_{co\text{-}polar} = D_x \sin\theta + D_z \cos\theta \quad (10)$$

and $$D_{cross\text{-}polar} = D_x \cos\theta - D_z \sin\theta \quad (11)$$

where $D_x$ and $D_z$ are data points for scattered radiation received in the receivers (which are oriented in the x and z directions) and $D_{co\text{-}polar}$ and $D_{cross\text{-}polar}$ are the transformed data points that would be seen for two orthogonal receivers rotating synchronously with the transmitter (or rotating wires). The transformation from the detected scattered radiation to the detected scatter radiation that would have been seen by co-rotating receivers may be performed in software.

In an embodiment, the transmitter may be static and the receiver may be rotating. Where this is the case, more than one transmitter may be provided. The transmitters may comprise two orthogonally configured transmitters (i.e. a first transmitter configured to transmit radiation having a first linear polarisation and a second transmitter configured to transmit radiation having a second orthogonal linear polarisation).

In some embodiments of the invention described above, the transmitter and receiver both rotate through 360°, and may rotate through 360° a plurality of times. In an alternative embodiment the transmitter and receiver may be rotated through less than 360°, and may for example be rotated through 90° or more. Rotation through 90° allows an anisotropic object such as a knife to be identified irrespective of the orientation of the knife on the body of a person being monitored (rotation beyond 90° may not provide any additional information which may be used to identify the object). Rotation through less than 90° may used. However, a rotation of significantly less than 90° may give rise to the risk that an anisotropic object may be held in an orientation which does not give rise to sufficiently strong cross-polarisation scattered radiation, and that the anisotropic object is then not identified.

In alternative embodiments of the invention, instead of using a rotating transmitter or two transmitters which transmit radiation with different linear polarisations, a transmitter which transmits circularly polarised radiation or elliptically polarised radiation is used. The circularly or elliptically polarised radiation may be considered to include a first component which has a first polarisation and a second component which has a second orthogonal polarisation. If radiation having right circular polarisation (RCP) is transmitted towards an isotropic object, then radiation which is scattered from the isotropic object will have left circular polarisation (LCP). Radiation which is scattered from an anisotropic object will include an RCP component, which may be independent of the orientation of the object. The detection system may therefore for example comprise a transmitter configured to transmit RCP radiation and a detector configured to detect RCP radiation (or alternatively a transmitter configured to transmit LCP radiation and a detector configured to detect LCP radiation).

It may be difficult to construct a transmitter which transmits circularly polarised radiation over the range of frequencies used in a frequency sweep, and the radiation may be elliptically polarised rather than circularly polarised at some frequencies. However, if a receiver which has the same or similar design to the transmitter is used, then this may mitigate for at least some of the elliptically polarised radiation, and may provide good rejection of radiation scattered by isotropic objects.

Circular or elliptically polarised radiation may be generated using two orthogonally oriented, linearly polarised, transmitters, the second transmitter being 90° out of phase with the first transmitter (or out of phase by some other amount in the case of elliptically polarised radiation). Alternatively circular or elliptically polarised radiation may be generated from a single antenna which has a polarisation dependent delay, for example a spiral antenna.

Quadrature detection may be required when using circular or elliptically polarised radiation, since phase information may be needed in order to determine scattering parameters using measured scattered radiation (for example to separate the received radiation into two orthogonal linear polarisation components).

A limitation of embodiments which use elliptically polarised radiation is that the amount of the scattered radiation received at the receiver may vary with the orientation of the anisotropic object. This variation may increase with the ellipticity of the radiation.

The detected scattered radiation may be recorded as a series of data values, which may for example be sampled periodically during a frequency sweep. The sampling may be synchronised such that it starts when a frequency sweep starts. If the frequency sweep comprises a series of steps of frequency then a data value or values may be recorded for each frequency. The number of data values which are acquired per sweep may for example be 256 or more.

The computer 112, 112a-c may include, or be connected to a high speed data acquisition card (for example a PCI-6132 available from National Instruments of Texas, USA).

The term "computer" 112, 112a-c is used in the above described embodiments for brevity. It may encompass a microprocessor, digital signal processor (DSP), field programmable gate array (FPGA), a state machine, programmable logic controller (PLC) or other processing circuit, general purpose computer, special purpose computer, or other data processing apparatus. The term 'processor' may be considered to encompass all of these. The "computer" may be controlled using control software including Labview or C# code, among others.

Embodiments of the invention which provide quadrature detection may incorporate a four port Vector Network Analyser (VNA). The VNA may for example be a 40 GHz Rohde Schwarz SVA Vector Network Analyzers, available from Rohde Schwarz of Munich, Germany.

Rotation of the polarisation of the radiation transmitted by the transmitter may be achieved using the Faraday effect. Similarly, rotation of the polarisation of radiation received by the receiver may be achieved using the Faraday effect.

Embodiments of the invention may provide directed radiation. The term 'directed radiation' may be interpreted as meaning radiation which propagates predominantly in one direction. The directed radiation may for example provide radiation with a desired diameter at a predetermined distance from a transmitter. It is not necessary for the radiation to be a beam at the diffraction limit.

Embodiments of the invention may be particularly suited to detecting the presence of anisotropic objects such as knives, metal blades, scissors, or similar articles.

Described embodiments of the invention use a receiver which is configured to receive radiation that is polarised orthogonally to radiation transmitted by a transmitter (i.e. the polarisation of the receiver is orthogonal to the polarisation of the transmitter). This arrangement ensures that detected scattered radiation is cross-polarised. It is not essential that the receiver and transmitter have orthogonal polarisations, provided that a cross-polarised component is present in the signal received by the receiver. Processing based upon signals received with different receiver orientations may be used to distinguish the cross-polarised component of the detected scatter radiation from a co-polarised component.

The embodiments of the invention shown in FIGS. 1 and 9 are described as providing synchronised rotation of the transmitter and receiver. This arrangement ensures that an angle subtended between the transmitter and receiver remains constant. It is not essential that this is the case however, and processing may be used to take into account non-synchronised rotation of the transmitter and receiver. In order to achieve this it may be necessary to monitor the angular orientations of the transmitter and the receiver.

Although embodiments of the invention have predominantly focussed on the detection of cross-polarised radiation, embodiments of the invention may use detection of co-polarised radiation. Where this is done, the detected co-polarised radiation may provide information that is of assistance in identifying an object. As may be seen from comparison of FIGS. 6 and 7, detection of co-polarised radiation may be less suited to identification of objects than detection of cross-polarised radiation. However measurement of a signal containing a co-polar component as well as a cross-polar component can give additional information, for example to ensure that the beam is correctly aligned on the target (the co-polarisation return is typically maximised for good alignment). In the embodiments that are shown in FIGS. 8 and 10, the detection channels not being utilised to measure the cross-polarised signal, are dominated by the co-polar signal and hence may be recorded simultaneously and included in subsequent analysis.

Embodiments of the invention may use microwave radiation. The term "microwave radiation" may encompass radiation in the centimetre to millimetre wavelength range.

In an embodiment, the object detection system may be portable. For example, the object detection system may be small enough to be carried by one person. The object detection system may be small enough to be transported in an automobile and be operable from within the automobile.

Although the transmitters 104, 104a-d are referred to as being gain horns with associated focussing optics, the transmitters may comprise any suitable antenna, such as a cassegrain antenna, and may be provided without focussing optics where appropriate.

Embodiments of the invention may record the orientation of the receiver when scattered radiation is detected (and optionally the orientation of the transmitter). The orientation of the receiver may be associated with detected scattered radiation values to allow the orientation to be taken into account during analysis of the detected scattered radiation.

As explained further above, radiation is directed onto a person using the transmitter 104a-d, such that at least part of the object is illuminated by the radiation. This may be achieved for example by a user manually pointing the radiation beam towards a person being monitored such that it passes over areas where the target is expected to conceal a knife or other object. The user may for example manually point the radiation beam by changing the direction in which the transmitter(s) 104, 104a-d is pointing. In an alternative arrangement, the radiation beam may be moved in a via mechanical movement of the transmitter(s) 104, 104*a-d* such that the radiation beam passes over areas where the target is expected to conceal a knife or other object. The mechanical movement may for example provide scanning motion of the radiation beam. In a further alternative arrangement the radiation beam may be moved via movement of a beam steering apparatus. The movement of the beam steering apparatus may for example be manually performed by the user or may be mechanically performed automatically.

In a further alternative arrangement, an array of fixed transmitters may be used to generate radiation beams which are directed towards different locations which correspond with areas where a person being monitored is expected to conceal a knife or other object. An array of receivers may also be used.

The radiation beam may have a diameter which is commensurate with the size of an object which may be detected (e.g. the size of a knife or a gun) when it is incident upon a person being monitored. The diameter of the radiation beam may however be larger or smaller than this. For example, the diameter of the radiation beam may be up to twice as large as the size of an object which may be detected, or may be larger than this. The diameter of the radiation beam may be as little as half as a large as the size of an object which may be detected, or may be less than this. The diameter of the radiation beam may for example be greater than 10 cm, may be 20 cm or more, or may be 30 cm or more.

The power of the radiation may for example be between 0 dB and 5 dB, and may be up to 20 dB or greater.

Given the relatively large diameter of the radiation beam, movement of the radiation beam over areas where a person being monitored is expected to conceal a knife or other object may be undertaken relatively quickly. This reduces inconvenience for the person being monitored, and allows more people to be monitored in a given period of time.

The microwave source 100, 100*a-e* may for example be a 40 GHz Microwave Synthesizer available from Agilent Technologies of California, USA. The microwave source may be any suitable ultra-wide band microwave and/or millimetre wave source.

The detector 108, 108*a,b* may be a zero-bias direct detector, or may be any other suitable detector. The detector 108, 108*a,b* may be a square law detector.

In a quadrature detection system the frequency range of the swept frequency radiation is inversely proportional to the range resolution of the detection system (i.e. the resolution with which different distances from the transmitter and receiver can be discriminated).

In an embodiment, the transmitter and the receiver may be formed using the same antenna.

Direct detection embodiments of the invention (e.g. as shown in FIGS. 1 and 8) may be cheaper to provide than quadrature embodiments of the invention (e.g. as shown in FIGS. 9 and 10) because they do not require components associated with quadrature detection. However, direct detection embodiments will not provide range information that may be used to discriminate between radiation reflected from a person being monitored and radiation reflected from background structures. This disadvantage may be mitigated by ensuring that the radiation is directed at, and is incident upon, a person being monitored.

Embodiments of the invention may transmit radiation having a polarisation that is orthogonal (or substantially orthogonal) to the direction of propagation of the radiation. Alternatively, embodiments of the invention may transmit radiation having a polarisation with a significant component that is parallel to the direction of propagation of the radiation. Where this is done, the detection system may be configured to detect changes of this polarisation component due to scattering. The matrix of Equation (1) may then be a nine element matrix rather than a four element matrix.

Embodiments of the invention may use any number of frequency sweeps. A greater number of frequency sweeps may improve the accuracy of the detection system.

Embodiments of the invention are described in relation to scattering parameters of objects. The scattering parameters may be considered to determine the polarisation state of crossed-polarisation detected scattered radiation that will be seen when radiation is directed at the objects. It is this polarisation state that may be analysed to determine whether or not an object is present (and which may be used to determine the identity of the object). The analysis may also take into account the amplitude of the detected scattered radiation. In this context the term 'amplitude' may be considered to encompass the square of the amplitude (irradiance) or other related measurements.

Although described embodiments of the invention all use swept frequency radiation, this is not essential and embodiments of the invention may for example use radiation at a single frequency. The swept frequency of the radiation may provide information about the depth of the object (i.e. the size of object in a direction substantially parallel to the direction of propagation of the radiation). This may assist in determining whether the object is a threat object or a non-threat object, and may assist the identification of the object.

Embodiments of the invention may include a coaxially mounted video camera configured to relay to an operator the position of an object when it is detected.

Although embodiments of the invention have been described in terms of detecting objects carried by people, embodiments of the invention may be used to detect objects in other locations such as within a bag (e.g. if the bag is constructed from material(s) transparent or substantially transparent to the radiation which do not give rise to significant amounts of cross-polarised scattered radiation).

The detection system may be sufficiently portable that it may be used in a hand held manner.

Detected scattered radiation may be normalised said according to the range of one or more detected signals.

Embodiments of the invention may be used in combination with other detection systems or detection methods. For example, embodiments of the invention may be used in combination with known swept reflectrometry systems or methods, and/or barrel tone detection systems or methods, and/or late time response (LTR) detection systems or methods. Embodiments of the invention may be used in combination with systems or methods described in international patent application WO2009/115818, which is herein incorporated by reference.

Embodiments of the invention may be added to conventional microwave or millimetre wave imaging systems.

Embodiments of the invention may be used in applications where conventional metal detector booths are inappropriate. These may include covert surveillance and mobile operation in streets and buildings. Embodiments of the invention may provide stand-off detection, for example from several meters.

The invention claimed is:

1. A detection method comprising:
   directing radiation such that the radiation is incident upon a target, the radiation containing a component having a first polarisation, and detecting radiation which is scattered from the target;
   subsequently transmitting radiation such that the subsequently transmitted radiation is incident upon the target, the subsequently transmitted radiation containing a component having a different polarisation which is non-orthogonal to the first polarisation, and detecting the subsequently transmitted radiation which is scattered from the target, the radiation which is scattered from the target and the subsequently transmitted radiation which is scattered from the target comprising detected scattered radiation; and analysing a polarisation state of the detected scattered radiation to determine whether the target includes an object.

2. The detection method of claim 1, wherein the analysis comprises comparing the polarisation state of the detected scattered radiation with polarisation states of scattered radiation which would be expected if an object was present.

3. The detection method of claim 1, wherein the radiation is swept frequency radiation.

4. The detection method of claim 3, wherein the analysis comprises comparing a pattern in the frequency response of the detected scattered radiation with previously recorded patterns, or performing a substantially equivalent comparison in the time domain.

5. The detection method of claim 3, wherein the swept frequency radiation comprises radiation which is stepped through a plurality of discrete frequencies.

6. The detection method of claim 1, wherein the analysis determines whether the object is a threat object or a non-threat object.

7. The detection method of claim 1, wherein the analysis provides an identification of the object.

8. The detection method of claim 1, wherein the detected scattered radiation is cross-polarised scattered radiation.

9. The detection method of claim 1, wherein the radiation is provided with a rotating linear polarisation.

10. The detection method of claim 9, wherein the radiation is detected using a receiver which provides rotating detection of linear polarisation.

11. The detection method of claim 9, wherein the radiation is detected using a first receiver configured to receive radiation having a first linear polarisation and a second receiver configured to receive radiation having a second linear polarisation.

12. The detection method of claim 1, wherein the radiation is generated using a first transmitter configured to transmit radiation having a first linear polarisation and is subsequently generated using a second transmitter configured to transmit radiation having a second linear polarisation.

13. The detection method of claim 12, wherein the radiation is detected using a first receiver configured to receive radiation having a third linear polarization and a second receiver configured to receive radiation having a fourth linear polarisation.

14. The detection method of claim 13, wherein the third linear polarization is substantially orthogonal to the first linear polarisation and the fourth linear polarisation is substantially orthogonal to the second linear polarisation.

15. The detection method of claim 12, wherein the second linear polarisation subtends an angle of around 45° relative to the first linear polarisation.

16. The detection method of claim 1, wherein the radiation is generated using a transmitter which transmits circularly or elliptically polarised radiation.

17. The detection method of claim 16, wherein the detected scattered radiation is received by a receiver which is configured to receive radiation having the same handedness of polarisation as the transmitted radiation.

18. The detection method of claim 1, wherein the analysis of the detected scattered radiation does not include phase information.

19. The detection method of claim 1, wherein the analysis of the detected scattered radiation includes phase information.

20. The detection method of claim 1, wherein the analysis is performed using an artificial neural network which has been trained to identify patterns from previously detected objects.

21. A detection system comprising:
a transmitter configured to direct radiation containing a component having a first polarisation such that the radiation is incident upon a target,
the transmitter being configured to subsequently direct radiation such that the subsequently directed radiation is incident upon the target, the subsequently directed radiation containing a component having a different polarisation which is non-orthogonal to the first polarisation,
wherein the detection system further comprises a receiver and detector configured to receive and detect radiation which is scattered from the target, and
a processor which is configured to analyse a polarisation state of the detected scattered radiation to determine whether the target includes an object.

22. The detection system of claim 21, wherein the detection system is sufficiently portable that it may be used in a hand held manner.

* * * * *